United States Patent
Kondo et al.

(10) Patent No.: US 8,755,336 B2
(45) Date of Patent: Jun. 17, 2014

(54) WIRELESS DEVICE WHICH CAN IMPROVE STABILITY IN WIRELESS COMMUNICATIONS AND WIRELESS NETWORK USING THE SAME

(75) Inventors: Yoshihisa Kondo, Kyoto (JP); Tetsuya Ito, Tokyo (JP); Akira Matsumoto, Tokyo (JP); Jun Hasegawa, Kyoto (JP); Satoko Itaya, Kyoto (JP); Kenichi Abe, Tokyo (JP); Peter Davis, Kyoto (JP); Naoto Kadowaki, Kyoto (JP); Sadao Obana, Kyoto (JP)

(73) Assignees: Nec Communications Systems, Ltd., Tokyo (JP); Advanced Telecommunications Research Institute International, Kyoto (JP)

( * ) Notice: Subject to any disclaimer, the term of this patent is extended or adjusted under 35 U.S.C. 154(b) by 1445 days.

(21) Appl. No.: 12/068,913

(22) Filed: Feb. 13, 2008

(65) Prior Publication Data

US 2008/0192724 A1 Aug. 14, 2008

(30) Foreign Application Priority Data

Feb. 14, 2007 (JP) .................................. 2007-032922

(51) Int. Cl.
*H04B 7/212* (2006.01)
*H04W 4/00* (2009.01)

(52) U.S. Cl.
USPC ........... 370/329; 370/322; 370/341; 370/348; 370/443

(58) Field of Classification Search
USPC ............................................ 370/329
See application file for complete search history.

(56) References Cited

U.S. PATENT DOCUMENTS

| | | | |
|---|---|---|---|
| 2005/0254470 A1* | 11/2005 | Yashar | 370/338 |
| 2005/0286426 A1* | 12/2005 | Padhye et al. | 370/238 |
| 2006/0002350 A1* | 1/2006 | Behroozi | 370/338 |
| 2006/0067226 A1* | 3/2006 | Chandra et al. | 370/235 |
| 2007/0076693 A1* | 4/2007 | Krishnaswamy | 370/352 |
| 2010/0027464 A1* | 2/2010 | Luo et al. | 370/328 |

FOREIGN PATENT DOCUMENTS

| | | |
|---|---|---|
| JP | 9-46290 A | 2/1997 |
| JP | 2968706 B2 | 11/1999 |
| JP | 2003-115858 A | 4/2003 |
| JP | 2006-101477 A | 4/2006 |
| JP | 2006-518970 A | 8/2006 |
| WO | 2004/077727 A2 | 9/2004 |

OTHER PUBLICATIONS

Mathieu Lacage et al.; "IEEE 802.11 Rate Adaptation: A Practical Approach", MSWiM'04, Oct. 4-6, 2006.

(Continued)

*Primary Examiner* — Kwang Yao
*Assistant Examiner* — Jutai Kao
(74) *Attorney, Agent, or Firm* — Westerman, Hattori, Daniels & Adrian, LLP

(57) ABSTRACT

When wireless communications are made between a first wireless device and a second wireless device along a route, two wireless devices which exist between the first and second wireless devices each determine the lowest maximum transmission rate (11 Mbps) in the wireless intervals on the route from themselves to the second wireless device to be their own transmission rate txRate (11 Mbps) and two other wireless devices which exist between the first and second wireless devices each determine the lowest maximum transmission rate (54 Mbps) in the wireless intervals on the route from themselves to the second wireless device to be their own transmission rate txRate (54 Mbps).

13 Claims, 15 Drawing Sheets

(56) References Cited

OTHER PUBLICATIONS

Itoh, Tomoaki et al.; "Adaptive Encoding/Transmission Control Method for Transmission Environment Fluctuation"; The Institute of Electronics, Information and Communication Engineers, Technical Report of IEICE, vol. 100, No. 540, Jan. 5, 2001, pp. 43-48.
Japanese Office Action dated Feb. 10, 2009, issued in corresponding Japanese Patent Application No. 2007-032922.
Itoh, Tomoaki et al.; "Adaptive Encoding/Transmission Control Method for Transmission Environment Fluctuation"; The Institute of Electronics, Information and Communication Engineers, Technical Report of IEICE, vol. 100, No. 540, Jan. 5, 2001, pp. 43-48. Cited in JP OA of Feb. 10, 2009 issued in 2007-032922. English Translation (Partial).
Japanese Office Action dated Feb. 10, 2009, issued in corresponding Japanese Patent Application No. 2007-032922. English Translation.
Mathieu Lacage et al.; "IEEE 802.11 Rate Adaptation: A Practical Approach", MSWiM'04, Oct. 4-6, 2004.

* cited by examiner

| DESTINATION | NEXT WIRELESS DEVICE | HOP NUMBER |
|---|---|---|
| ----- | -------- | ----- |
| ----- | -------- | ----- |
| ⋮ | ⋮ | ⋮ |

Fig. 5

NTBL

| SELF ADDRESS | NEIGHBOR WIRELESS DEVICE ADDRESS |
|---|---|
|  | ------- |
| ------- | ------- |
|  | ⋮ |

Fig. 6A

NTBL_31

| SELF ADDRESS | NEIGHBOR WIRELESS DEVICE ADDRESS |
|---|---|
| IPaddress31 | IPaddress32 |
| | IPaddress37 |

Fig. 6B

NTBL_32

| SELF ADDRESS | NEIGHBOR WIRELESS DEVICE ADDRESS |
|---|---|
| IPaddress32 | IPaddress31 |
| | IPaddress35 |
| | IPaddress36 |

Fig. 6C

NTBL_36

| SELF ADDRESS | NEIGHBOR WIRELESS DEVICE ADDRESS |
|---|---|
| IPaddress36 | IPaddress32 |
| | IPaddress35 |
| | IPaddress37 |
| | IPaddress38 |
| | IPaddress39 |
| | IPaddress41 |

| AVERAGE RECEIVED SIGNAL STRENGTH | STANDARD TRANSMISSION RATE |
|---|---|
| ~-85dB | 6Mbps |
| -85dB~-82dB | 9Mbps |
| -82dB~-80dB | 12Mbps |
| -80dB~-78dB | 18Mbps |
| -78dB~-75dB | 24Mbps |
| -75dB~-72dB | 36Mbps |
| -72dB~-65dB | 48Mbps |
| -65dB~ | 54Mbps |

21A

| DESTINATION | NEXT WIRELESS DEVICE | HOP NUMBER |
|---|---|---|
| IPaddress40 | IPaddress32 | 4 |
| IPaddress43 | IPaddress37 | 3 |
| IPaddress38 | IPaddress32 | 3 |
| ⋮ | ⋮ | ⋮ |

WIRELESS DEVICE WHICH CAN IMPROVE STABILITY IN WIRELESS COMMUNICATIONS AND WIRELESS NETWORK USING THE SAME

FIELD OF THE INVENTION

The present invention relates to a wireless device and a wireless network using the same and more particularly to a wireless device used in an autonomously established wireless network and a wireless network using the same.

DESCRIPTION OF THE RELATED ART

An ad-hoc network is a network which is autonomously constructed on the spot by a plurality of wireless devices communicating with each other. In an ad-hoc network, when two wireless devices communicating with each other are not within each other's communication area, a wireless device located between the two wireless devices functions as a router to relay data packets, thereby permitting construction of an extensive multi-hop network.

Dynamic routing protocols which support multi-hop communications are classified into two types: table-driven protocols and on-demand protocols. A table-driven protocol exchanges routing control information periodically and creates a routing table in advance. Known protocols of this type include FSR (Fish-eye State Routing), OLSR (Optimized Link State Routing) and TBRPF (Topology Dissemination Based on Reverse-Path Forwarding).

An on-demand protocol does not establish a route to a destination until a data transmission request is generated. Known on-demand protocols include DSR (Dynamic Source Routing) and AODV (Ad Hoc On-Demand Distance Vector Routing).

In a conventional ad-hoc network, the transmission rate has been determined for each wireless interval to ensure high speed and stable wireless communications in each wireless interval (Lacage M., Manshaei M. and T. Turletti, "IEEE802.11 Rate Adaptation: A Practical Approach", MSWiM'04, Oct. 4-6, 2004, Venezia, Italy).

BRIEF SUMMARY OF THE INVENTION

However, in multi-hop wireless communications where data is relayed across plural wireless intervals, rate control suitable for one wireless interval is not always suitable for the whole data relay route.

For example, when wireless device A wirelessly communicates with wireless device C through wireless device B, let us say the transmission rate in the wireless interval from wireless device A to wireless device B and that in the wireless interval from wireless device B to wireless device C have been determined to be 54 Mbps and 11 Mbps respectively.

In this case, if wireless device A is going to transmit high-load data to wireless device C, the buffer of wireless device B, which receives more data than it can transmit, will overflow and data loss will often occur. Consequently, stability in wireless communications will deteriorate.

Also, since multi-hop wireless communications use a plurality of wireless intervals, the problem of hidden terminals inherent in wireless communications is likely to arise and the packet loss rate is higher than in wireless communications which use only one wireless interval.

Consequently, the conventional system in which packet loss directly influences the decision about transmission rates has a problem that it is difficult to achieve a high transmission rate and a high throughput.

Furthermore, in multi-hop wireless communications which involve movement of nodes, there may be significant environmental variations between wireless intervals, so it may be difficult to follow environmental variations in the conventional system in which the quality of a wireless interval is measured for a certain period to determine the transmission rate for the interval.

Therefore, the present invention has been made to solve the above problem and an object thereof is to provide a wireless device which can improve stability in wireless communications.

Another object of the invention is to provide a wireless network including a wireless device which can improve stability in wireless communications.

According to one aspect of the invention, there is provided a wireless device constituting an autonomously established wireless network, which comprises a means for determining transmission rates and a transmitting means. The means for determining transmission rates determines, among n maximum transmission rates in n wireless intervals existent between the wireless device and a destination wireless device (n is a positive integer), the lowest maximum transmission rate to be the wireless device's transmission rate. The transmitting means transmits a packet at the transmission rate determined by the means for determining transmission rates.

Preferably the wireless device further comprises a means for determining maximum transmission rate. The means for determining maximum transmission rate determines the n maximum transmission rates according to packet delivery performance indicating the performance of packet delivery to wireless devices existent in the n wireless intervals. The means for determining transmission rates determines the lowest maximum transmission rate among the n maximum transmission rates determined by the means for determining maximum transmission rate to be the wireless device's transmission rate.

Preferably the means for determining maximum transmission rate determines the n maximum transmission rates according to the type of application which generates a packet and the packet delivery performance.

Preferably the means for determining maximum transmission rate determines the n maximum transmission rates according to the size of the packet and the packet delivery performance.

Preferably the means for determining maximum transmission rate holds the relation between packet delivery performance and standard transmission rate, and detects a standard transmission rate corresponding to the packet delivery performance, and determines the n maximum transmission rates by carrying out weighting on the detected standard transmission rate by packet size.

Preferably, when the packet size is relatively large, the means for determining maximum transmission rate, if the data delivery performance is a first data delivery performance or above, determines the n maximum transmission rates by selecting the highest standard transmission rate among a plurality of usable standard transmission rates as maximum transmission rate; on the other hand, when the packet size is relatively small, if the data delivery performance is a second data delivery performance better than the first data delivery performance or above, it determines the n maximum transmission rates by selecting the highest standard transmission rate among the plural standard transmission rates as maximum transmission rate.

Preferably the wireless device further comprises an acquiring means and a means for establishing routes. The acquiring means acquires performance of data delivery to all wireless devices constituting the wireless network. The means for establishing routes establishes a route from the wireless device to the destination wireless device. The means for determining maximum transmission rate selects performance of data delivery to wireless devices existent on the route established by the means for establishing routes from among data delivery performances acquired by the acquiring means and determines the n maximum transmission rates using the selected data delivery performance.

Preferably the acquiring means acquires performance of data delivery to all the wireless devices in synchronization with transmission and receipt of route information in the wireless network.

Preferably the wireless device further comprises an acquiring means. The acquiring means acquires performance of data delivery to wireless devices existent in the n wireless intervals in the process of establishing a route from a source to a destination. The means for determining maximum transmission rate determines the n maximum transmission rates using the data delivery performance acquired by the acquiring means.

Preferably the data delivery performance consists of an average received signal strength indicator.

Preferably the wireless device further comprises a means for determining maximum transmission rate. When transmission rate gives more influence on throughput than packet loss, the means for determining maximum transmission rate determines the n maximum transmission rates by selecting a relatively high standard transmission rate among a plurality of usable standard transmission rates as maximum transmission rate, and when the packet loss gives more influence on throughput than the transmission rate, it determines the n maximum transmission rates by selecting a relatively low standard transmission rate among the plural standard transmission rates as maximum transmission rate. Then the means for determining transmission rates determines the lowest maximum transmission rate among the n maximum transmission rates determined by the means for determining maximum transmission rate to be the wireless device's transmission rate.

Preferably the wireless device further comprises a means for determining maximum transmission rate. When the packet size is larger than a threshold, the means for determining maximum transmission rate determines the n maximum transmission rates by selecting a relatively high standard transmission rate among a plurality of usable standard transmission rates as maximum transmission rate, and when the packet size is equal to or smaller than the threshold, it determines the n maximum transmission rates by selecting a relatively low standard transmission rate among the plural standard transmission rates as maximum transmission rate. Then the means for determining transmission rates determines the lowest maximum transmission rate among the n maximum transmission rates determined by the means for determining maximum transmission rate to be the wireless device's transmission rate.

According to another aspect of the present invention, the wireless network includes a wireless device as described in any of the appended claims 1 to 12.

In the present invention, a wireless device which transmits or relays a packet determines the lowest maximum transmission rate in at least one wireless interval on the route from the wireless device itself to a destination wireless device to be its own transmission rate and transmits or relays the packet at the determined transmission rate. This means that each wireless device transmits or relays a packet in a way that packet overflows do not occur in wireless devices on the route from the source to the destination and packet loss is thus reduced.

Consequently, according to the present invention, stability in wireless communications is improved.

Furthermore, in the present invention, a standard transmission rate is determined based on received signal strength and an advantageous transmission rate is determined in reference to the determined standard transmission rate according to quality measurement results of wireless intervals and the type of application or packet size. Therefore, even in multi-hop wireless communications with a relatively high packet loss rate, higher throughput and communication stability are assured.

Furthermore, in the present invention, a standard transmission rate is determined based on received signal strength and in reference to the determined standard transmission rate, modification of transmission rates is made according to the result of wireless interval quality measurement and the type of application or packet size. Consequently, transmission rates are adapted to environmental variations of wireless intervals so as to assure communication stability.

BRIEF DESCRIPTION OF THE DRAWINGS

The invention will be more particularly described with reference to the accompanying drawings, in which:

FIG. 4 shows the structure of the routing table shown in FIG. 2;

FIG. 5 schematically shows the structure of a neighbor list;

FIGS. 6A to 6C show examples of neighbor lists, in which FIG. 6A shows a list for a wireless device with IP address 31, FIG. 6B shows a list for a wireless device with IP address 32 and FIG. 6C shows a list for a wireless device with IP address 36;

FIGS. 8A and 8B illustrate how to detect data delivery performance in each wireless interval, in which FIG. 8A shows a wireless device receiving Hello messages and FIG. 8B shows the wireless device broadcasting a Hello message;

FIGS. 11A to 11D show the relation between throughput and transmission rate, in which FIG. 11A shows that for a packet size of 160 bytes; FIG. 11B shows that for a packet size of 500 bytes; FIG. 11C shows that for a packet size of 1000 bytes; and FIG. 11D shows that for a packet size of 1500 bytes;

FIGS. 12A and 12B illustrate how maximum transmission rate is determined by Determination Method 2, in which FIG. 12A is a graph for a packet size of 160 bytes and FIG. 12B is a graph for a packet size of 1500 bytes;

DETAILED DESCRIPTION OF THE INVENTION/DESCRIPTION OF THE PREFERRED EMBODIMENTS

Figure 1:
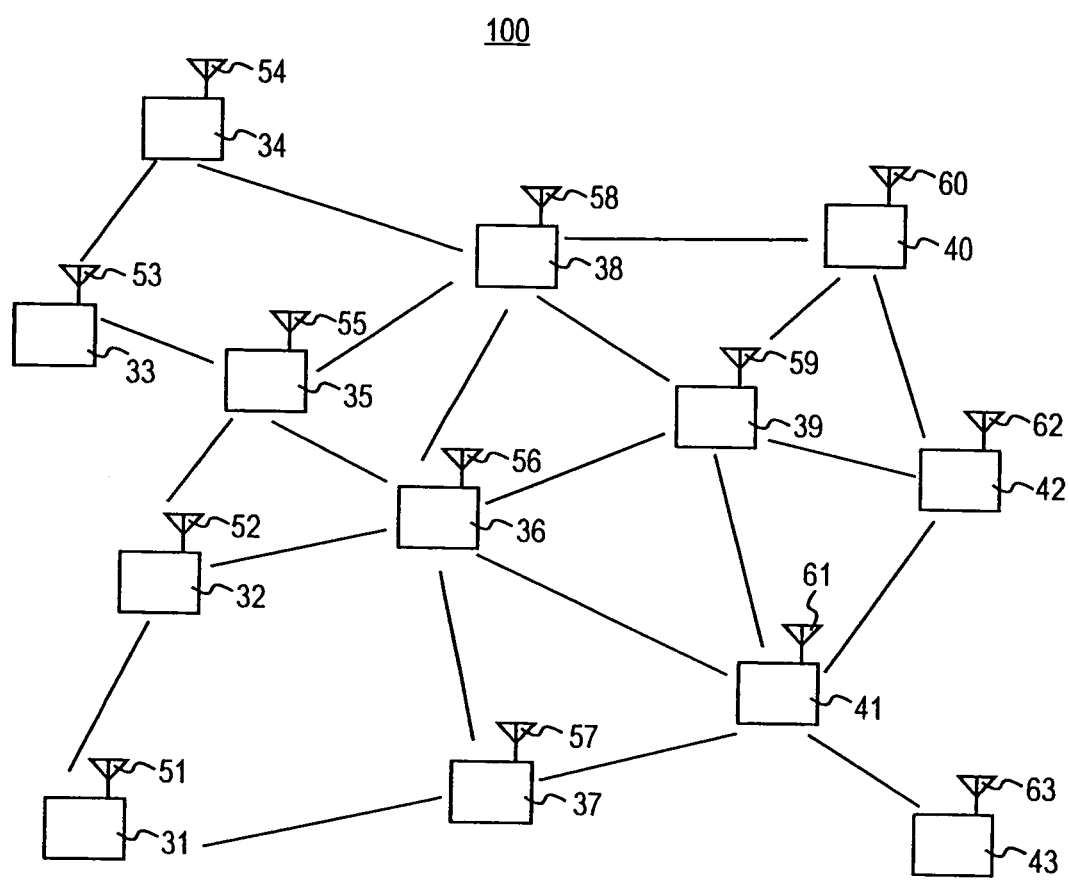
FIG. 1 is a schematic diagram of a wireless network using wireless devices according to a first embodiment of the present invention.

Next, the preferred embodiments of the present invention will be described in detail referring to the accompanying drawings. Basically in the drawings, the same or like elements are designated by the same reference numerals and a repeated description thereof is omitted.

FIG. 1 is a schematic diagram of a wireless network using wireless devices according to an embodiment of the present invention. The wireless network 100 includes wireless devices 31-43. Wireless devices 31-43 are located in a wireless communication space, constituting a wireless mesh network autonomously. Antennas 51-63 are attached to the wireless devices 31-43 respectively.

For example, in sending data from wireless device 31 to wireless device 42, wireless devices 32 and 35-41 relay the data from wireless device 31 to send it to wireless device 42.

In this case, wireless device 31 can make wireless communication with wireless device 42 via various routes. Specifically, wireless device 31 can make wireless communication with wireless device 42 via wireless devices 37 and 41 or via wireless devices 32, 36 and 39 or via wireless devices 32, 35, 38 and 40.

In the case of wireless communication via wireless devices 37 and 41, the number of hops (hop number) is the smallest or 3; in the case of wireless communication via wireless devices 32, 36 and 39, the hop number is 4; and in the case of wireless communication via wireless devices 32, 35, 38 and 40, the hop number is the largest or 5.

Hence, since the hop number is the smallest or 3 when the route via wireless devices 37 and 41 is selected, wireless device 31 elects to make multi-hop wireless communication with wireless device 42 via the following route: wireless device 31 to wireless device 37 to wireless device 41 to wireless device 42.

However, in such multi-hop wireless communication, if the transmission rate in the wireless interval between wireless devices 31 and 37 is 54 Mbps and that in the wireless interval between wireless devices 37 and 41 is 11 Mbps, the volume of data which wireless device 37 transmits would be smaller than the volume of data which it receives and packet overflowing would occur in the buffer of wireless device 37, leading to packet loss and deteriorated stability in multi-hop wireless communication.

As a solution to this problem, it will be explained how to make stable multi-hop wireless communication using the route established in the wireless network 100 when a wireless communication route is autonomously established.

First Embodiment

The first embodiment employs OLSR as the protocol which establishes a wireless communication route between a source and a destination. The OLSR protocol is a table-driven routing protocol which exchanges route information using Hello and TC (Topology Control) messages to create a routing table.

Figure 2:
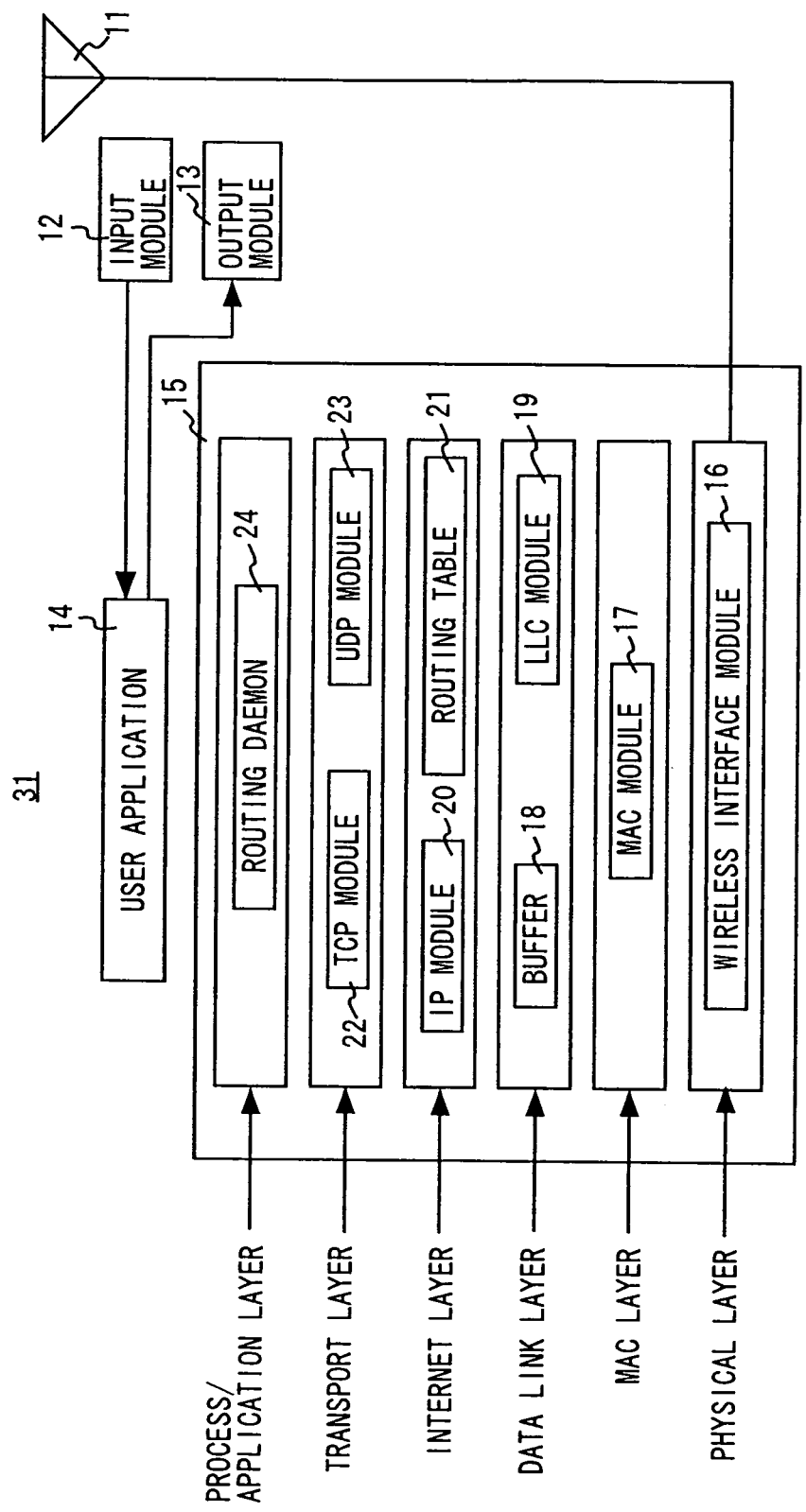
FIG. 2 is a schematic block diagram showing the configuration of each wireless device shown in FIG. 1 according to the first embodiment.

FIG. 2 is a schematic block diagram showing the configuration of wireless device 31 shown in FIG. 1 according to the first embodiment. Wireless device 31 includes an antenna 11, an input module 12, an output module 13, a user application 14, and a communication control module 15.

The antenna 11 constitutes each of antennas 51-63 shown in FIG. 1. The antenna 11 receives data from another wireless device via a wireless communication space and transfers the received data to the communication control module 15 and also transmits data from the communication control module 15 to another wireless device via the wireless communication space.

The input module 12 receives a message and a destination address which have been entered by the operator of wireless device 31 and transfers the received message and destination address to the user application 14. The output module 13 displays the message under the control of the user application 14.

The user application 14 generates data based on the message and destination address from the input module 12 and transfers it to the communication control module 15.

The communication control module 15 includes a plurality of modules which control communications in accordance with the ARPA (Advanced Research Projects Agency) Internet layer structure. Specifically, the communication control module 15 is comprised of a wireless interface module 16, a MAC (Media Access Control) module 17, a buffer 18, an LLC (Logical Link Control) module 19, an IP (Internet Protocol) module 20, a routing table 21, a TCP module 22, a UDP module 23, and a routing daemon 24.

The wireless interface module 16, belonging to the physical layer, modulates/demodulates transmitted signals or received signals in accordance with a given rule and transmits/receives signals via the antenna 11. The wireless interface module 16 detects the RSSI (Received Signal Strength Indicator) of a Hello packet which the antenna 11 has received from another wireless device and transfers the received RSSI to the routing daemon 24.

The MAC module 17, belonging to the MAC layer, executes the MAC protocol to perform various functions as described below.

The MAC module 17 broadcasts the Hello packet received from the routing daemon 24 via the wireless interface module 16. The MAC module also takes a packet out of the buffer 18 and transmits the packet at the transmission rate received from the IP module. Furthermore, the MAC module 17 is responsible for data (packet) retransmission control and other tasks. The MAC module 17 detects the rate of unicast retransmission rate as packet loss rate PKT_LOSS and transfers the detected packet loss rate PKT_LOSS to the IP module 20 and the routing daemon 24.

The buffer 18, belonging to the data link layer, stores the packet temporarily. The LLC module 19, belonging to the data link layer, executes the LLC protocol to connect and disconnect the link with a neighbor wireless device.

The IP module 20, belonging to the Internet layer, receives topology information TPIF indicating the general topology of the wireless network 100, from the routing daemon 24. The IP module 20 receives, from the routing daemon 24, average received signal strength indicator RSSI_AVE and received signal strength indicator RSSI standard deviation RSSI_DEV concerning Hello packets which wireless devices 31-43 have received from neighbor wireless devices. Also the IP module 20 receives packet loss rate PKT_LOSS from the MAC module 17. Furthermore, the IP module 20 transfers the transmission rate for multi-rate packet transmission, to the MAC module 17. Then, the IP module 20 determines the maximum transmission rate maxRate for each wireless interval according to the received topology information TPIF, average received signal strength indicator RSSI_AVE, received signal strength indicator RSSI standard deviation RSSI_DEV, and packet loss rate PKT_LOSS by a method which will be explained later, and creates a topology table in which the maximum transmission rate maxRate thus determined is written for each wireless interval.

The IP module 20 generates an IP packet. An IP packet consists of an IP header and an IP data field to store a packet of a higher level protocol. Upon receiving data from the TCP module 22, the IP module 20 stores the received data in the IP data field and generates an IP packet.

Then the IP module 20 searches the routing table 21 in accordance with the OLSR protocol, a table-driven routing protocol, and determines the route for transmission of the generated IP packet. Then the IP module 20 detects the maximum transmission rate maxRate for each of the wireless intervals on the determined route by reference to the topology table and determines the transmission route for the IP packet, based on the detected maximum transmission rates maxRate by a method which will be explained later.

Then the IP module 20 transfers the determined transmission rate to the MAC module 17 and transfers the IP packet to the LLC module 19 to transmit the IP packet to the destination along the determined route.

The routing table 21, belonging to the Internet layer, stores information on routes to different destinations in a manner which will be explained later.

The TCP module 22, belonging to the transport layer, generates a TCP packet. A TCP packet consists of a TCP header and a TCP data field to keep data of a higher level protocol. The TCP module 22 sends the generated TCP packet to the IP module 20.

The UDP module 23, belonging to the transport layer, broadcasts the Update packet generated by the routing daemon 24 and receives an Update packet broadcast from another wireless device and transfers it to the routing daemon 24.

The routing daemon 24, belonging to the process/application layer, monitors the operating conditions of other communication control modules and deals with requests from other communication control modules.

The routing module 24 also calculates average received signal strength indicator RSSI_AVE or average received signal strength indicator RSSI_AVE and received signal strength indicator RSSI standard deviation RSSI_DEV from the received signal strength indicators RSSI received from the wireless interface module 16 within a given period. The routing daemon 24 receives packet loss rate PKT_LOSS from the MAC module 17. Then, the routing daemon 24 generates a Hello packet which includes "average received signal strength indicator RSSI_AVE" or "average received signal strength indicator RSSI_AVE and packet loss rate PKT_LOSS" or "average received signal strength indicator RSSI_AVE and RSSI standard deviation RSSI_DEV" or "average received signal strength indicator RSSI_AVE, RSSI standard deviation RSSI_DEV and packet loss rate PKT_LOSS" and transfers it to the UDP module 23.

Furthermore, the routing daemon 24 takes the "average received signal strength indicator RSSI_AVE" or "average received signal strength indicator RSSI_AVE and packet loss rate PKT_LOSS" or "average received signal strength indicator RSSI_AVE and RSSI standard deviation RSSI_DEV" or "average received signal strength indicator RSSI_AVE, RSSI standard deviation RSSI_DEV and packet loss rate PKT_LOSS" which is included in the Hello packet received from another wireless device, and transfers the "average received signal strength indicator RSSI_AVE" or "average received signal strength indicator RSSI_AVE and packet loss rate PKT_LOSS" or "average received signal strength indicator RSSI_AVE and RSSI standard deviation RSSI_DEV" or "average received signal strength indicator RSSI_AVE, RSSI standard deviation RSSI_DEV and packet loss rate PKT_LOSS" which it has taken, to the IP module 20.

Furthermore, the routing daemon 24 calculates the optimum route from the route information of the Hello packets received from other wireless devices and dynamically creates a routing table 21 in the Internet layer.

Wireless devices 32-43 shown in FIG. 1 each have the same configuration as that of wireless device 31 shown in FIG. 2.

Figure 3:
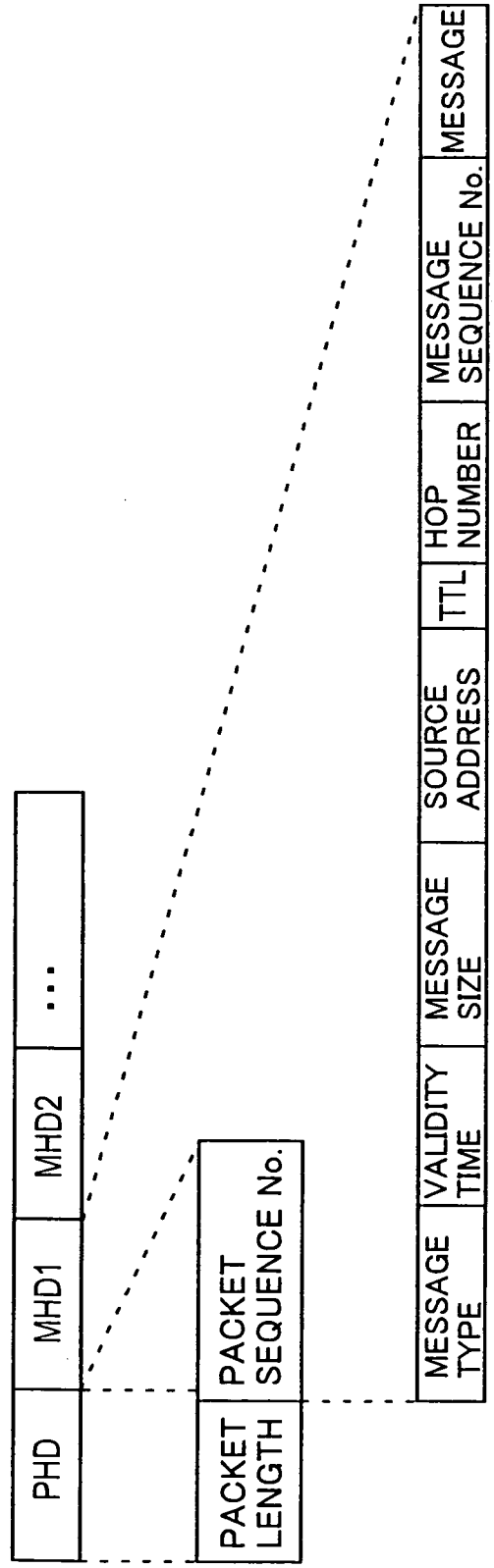
FIG. 3 shows the structure of a packet in the OLSR protocol.

FIG. 3 shows the structure of a packet PKT in the OLSR protocol. A packet PKT consists of packet header PHD and message headers MHD1, MHD2, . . . . A packet PKT is received or transmitted using port No. 698 of the UDP module 23.

The packet header PHD consists of Packet Length and Packet Sequence Number. The packet length consists of 16 bit data and represents the number of bytes in the packet. The packet sequence number consists of 16 bit data and is used to discriminate which packet is new. The packet sequence number is increased by one each time a new packet is generated. Therefore, the larger the packet sequence number is, the newer the packet PKT is.

The message headers MHD1, MHD2, . . . each consist of Message Type, Validity Time, Message Size, Source Address, TTL, Hop Number, Message Sequence Number, and a message.

The message type consists of 8 bit data and represents the type of the message written in the message field, where 0-127 are reserved. The validity time consists of 8 bit data and represents the time duration which the message must be maintained after its receipt. The validity time consists of a mantissa and an exponent.

The message size consists of 16 bit data and represents the length of the message. The source address consists of 32 bit data and represents the wireless device which has generated the message. TTL consists of 8 bit data and represents the maximum number of hops traveled to relay the message. TTL is decremented by one each time the message is relayed. When TTL is "0" or "1", the message is not relayed. The hop number consists of 8 bit data and represents the number of hops traveled from the source which has generated the message. The hop number is first set to "0" and increased by one upon each relay. The message sequence number consists of 16 bit data and represents an identification number allocated to each message. The message sequence number is increased by one each time a message is generated. The message is an object to be transmitted.

In the OLSR protocol, various messages are transmitted and received using packets PKT whose structure is as shown in FIG. 3.

FIG. 4 shows the structure of the routing table 21 shown in FIG. 2. The routing table 21 consists of Destination, Next Wireless Device, and Hop number. Source Address, Next Wireless Device and Hop number are related with each other. "Destination" represents the IP address of the destination wireless device. "Next Wireless Device" represents the IP address of the wireless device to which the packet PKT should be next sent to transmit it to the destination. "Hop Number" represents the number of hops traveled to reach the destination. For instance, referring to FIG. 1, for wireless communication between wireless devices 31 and 42 along the route from wireless device 31 through wireless device 32, wireless device 36, and wireless device 39 to wireless device 42, the routing table 21 of wireless device 32 keeps "3" for Hop Number.

FIG. 5 schematically shows the structure of neighbor list NTBL. The neighbor list NTBL includes Self Address and Neighbor Wireless Device Address. Self Address and Neighbor Wireless Device Address are related with each other. "Self Address" consists of the IP address of the wireless device which generates the neighbor list NTBL. "Neighbor Wireless Device Address" consists of the IP address of the wireless device adjacent to the wireless device which generates the neighbor list NTBL.

In the present invention, wireless devices 31-43 each make a routing table 21 according to the OLSR protocol. Next, how to make a routing table 21 according to the OLSR protocol will be explained in detail. When making a routing table 21, wireless devices 31-43 each receive and transmit a Hello message and a TCS message.

Hello messages are periodically transmitted to distribute information which wireless devices 31-43 hold. By receiving these Hello messages, wireless devices 31-43 can each collect information on surrounding wireless devices and recognize what kinds of wireless devices exist around them.

In the OLSR protocol, wireless devices 31-43 each maintain local link information. The Hello message is a message that is used to construct and transmit the local link information. The local link information includes "Link Set," "Neighbor Wireless Device Set," "2-hop Neighbor Set and Set of Links to the Devices," "MPR Set," and "MPR Selector Set."

Link Set refers to links to a set of wireless devices which radio waves reach directly (neighbor wireless devices) where each link is represented by validity times for a pair of addresses of two wireless devices. The validity times are also used to show whether the link is unidirectional or bidirectional.

Neighbor Wireless Device Set includes each neighbor wireless device's address and its willingness to retransmit. 2-hop Neighbor Set refers to a set of wireless devices adjacent to a neighbor wireless device.

MPR Set is a set of wireless devices selected as MPRs. MPR (Multi Point Relay) refers to a relay wireless device which is selected so that when each wireless device (31-43) transmits/receives a packet PKT only once, the packet PKT is transmitted to all wireless devices 31-43 of the wireless network 100.

MPR Selector Set refers to a set of wireless devices for a wireless device which have selected it as an MPR.

The process in which local link information is established is summarized as follows. At the initial stage, each wireless device (31-43) sends a Hello message containing its self address to neighbor wireless devices to notify of its existence. All wireless devices 31-43 do so and each wireless device (31-43) knows the existence of surrounding wireless devices and their addresses. In this way, a link set and a neighbor wireless device set are constructed.

The local link information thus constructed is again transmitted by Hello messages, continuing periodically. By repeating this process, whether each link is unidirectional or bidirectional and what wireless devices exist beyond neighbor wireless gradually becomes clear. Each wireless device (31-43) stores local link information constructed gradually in this way.

In addition, Hello messages also carry information on MPRs to wireless devices 31-43 periodically. Each wireless device (31-43) selects, from among neighbor wireless devices, several wireless devices which it requests to retransmit a packet PKT which it transmits, as a set of MPRs. Since this MPR set information is sent to neighbor wireless devices by a Hello message, a wireless device which has received the Hello message maintains information on a set of wireless devices which have selected it as an MPR. Consequently, each wireless device (31-43) can immediately know from which wireless devices it should retransmit packets PKT among those which it has received.

Once local link information has been constructed in each wireless device (31-43) by transmission/receipt of Hello messages, a TC message for notification of the general topology of the wireless network 100 is sent to wireless devices 31-43. This TC message is periodically sent to all wireless devices selected as MPRs. Since the TC message includes information on links between each wireless device and a MPR selector set, all wireless devices 31-43 of the wireless network 100 can know all MPR sets and all MPR selector sets and also recognize the general topology of the wireless network 100 based on the information on all MPR sets and all MPR selector sets. Each wireless device (31-43) calculates shortest routes using the general topology of the wireless network 100 and creates a routing table based on such shortest route information.

Apart from Hello messages, wireless devices 31-43 frequently exchange TC messages. MPRs are also used for exchange of TC messages.

Each wireless device (31-43) transmits and receives Hello messages and TC messages as mentioned above and recognizes the general topology of the wireless network 100 and calculates shortest routes and dynamically creates a routing table 21 shown in FIG. 4, based on such shortest route information.

FIGS. 6A to 6C show examples of neighbor lists. Wireless devices 32 and 37 generate and transmit Hello messages [IP address 32] and [IP address 37] which include their self addresses respectively; the routing daemon 24 of wireless device 31 receives the Hello messages [IP address 32] and [IP address 37] directly from wireless devices 32 and 37 respectively.

The routing daemon 24 of wireless device 31 creates a neighbor list NTBL_31 for wireless device 31 according to the Hello messages [IP address 32] and [IP address 37] (FIG. 6A).

The routing daemon 24 of wireless device 31 generates a Hello message including the neighbor list NTBL_31 and transmits it. Then, the routing daemon 24 of wireless device 31 generates a TC message which includes the IP addresses of wireless devices which are MPRs for wireless device 31 and floods it throughout the wireless network 100.

Wireless device 32 also creates a neighbor list NTBL_32 (FIG. 6B) with the above procedure and generates a Hello message including the neighbor list NTBL_32 and transmits it. Then the routing daemon 24 of wireless device 31, which has received the Hello message including the neighbor list NTBL_32, can know what wireless devices exist in an area two hops from wireless device 31. Then, wireless device 32 generates a TC message including the IP addresses of wireless devices which are MPRs for it and floods it throughout the wireless network 100.

Wireless device 36 also creates a neighbor list NTBL_36 (FIG. 6C) with the above procedure and generates a Hello message including the neighbor list NTBL_36 and transmits it. Consequently the routing daemon 24 of wireless device 32, which has received the Hello message including the neighbor list NTBL_36, can know what wireless devices exist in an area two hops from wireless device 32. Then, wireless device 36 generates a TC message including the IP addresses of wireless devices which are MPRs for it and floods it throughout the wireless network 100.

Furthermore, the other wireless devices 33-35 and 37-43 also create their own neighbor lists NTBL_33 to NTBL_35 and NTBL_37 to NTBL_43 with the above procedure respectively and generate Hello messages including the created neighbor lists NTBL_33 to NTBL_35 and NTBL_37 to NTBL_43, transmit them and generate TC messages including the IP addresses of wireless devices which are MPRs for them and flood them throughout the wireless network 100.

Through the above sequence of actions, wireless device 31 comes to know the existence of wireless devices 35, 36 and 41 within an area two hops from it and the wireless devices as MPRs for wireless devices 32-43.

Figure 7:
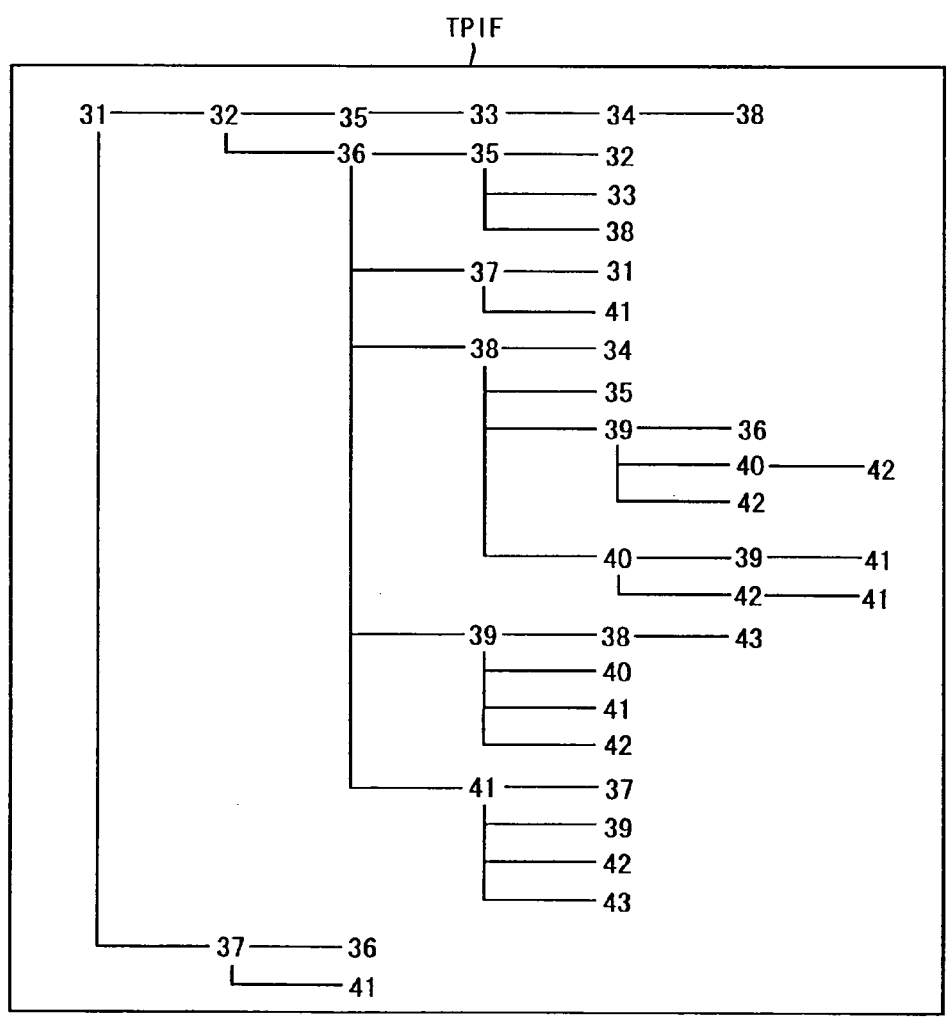
FIG. 7 is a conceptual diagram of topology information.

FIG. 7 is a conceptual diagram of topology information. Note that the topology information TPIF shown in FIG. 7 does not cover the complete topology of wireless devices 31-43 constituting the wireless network 100 but some part of the topology is omitted here.

In wireless device 31, the routing daemon 24, knowing the existence of wireless devices 35, 36 and 41 within an area two hops from wireless device 31 as well as the wireless devices which are MPRs for wireless devices 32-43, creates topology information TPIF which shows the topology of wireless devices 31-43 constituting the wireless network 100.

Next, it is explained how the maximum transmission rate maxRate for each wireless interval is determined. The maximum transmission rate maxRate for each wireless interval is determined using performance of data delivery to the wireless devices constituting the wireless interval. In the present invention, data delivery performance consists of either of the following:

1. average received signal strength indicator RSSI_AVE
2. average received signal strength indicator RSSI_AVE+ packet loss rate PKT_LOSS
3. average received signal strength indicator RSSI_AVE+ received signal strength indicator RSSI standard deviation RSSI_DEV
4. average received signal strength indicator RSSI_AVE+ received signal strength indicator RSSI standard deviation RSSI_DEV+packet loss rate PKT_LOSS Maximum Transmission Rate Determination Method 1

In Maximum Transmission Rate Determination Method 1, data delivery performance consists of average received signal strength indicator RSSI_AVE.

Figure 8A:
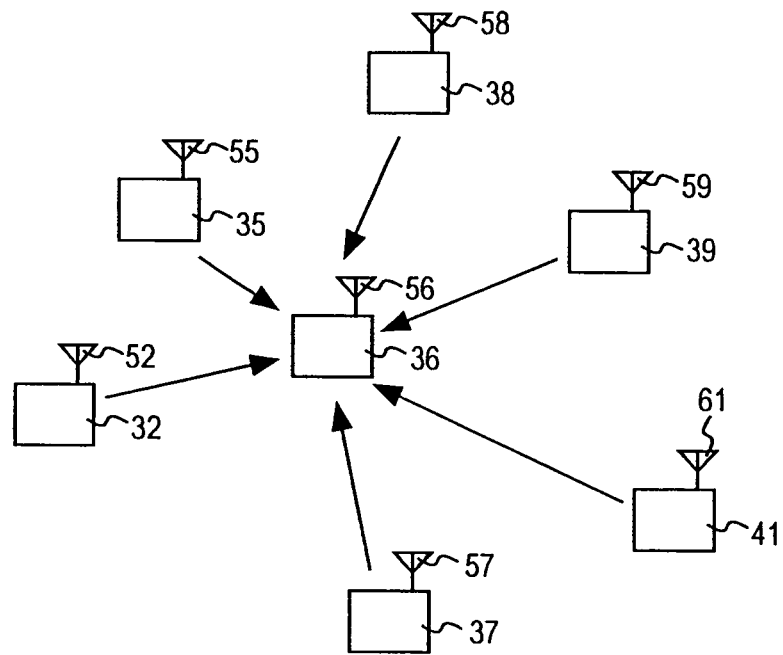
Figure 8B:
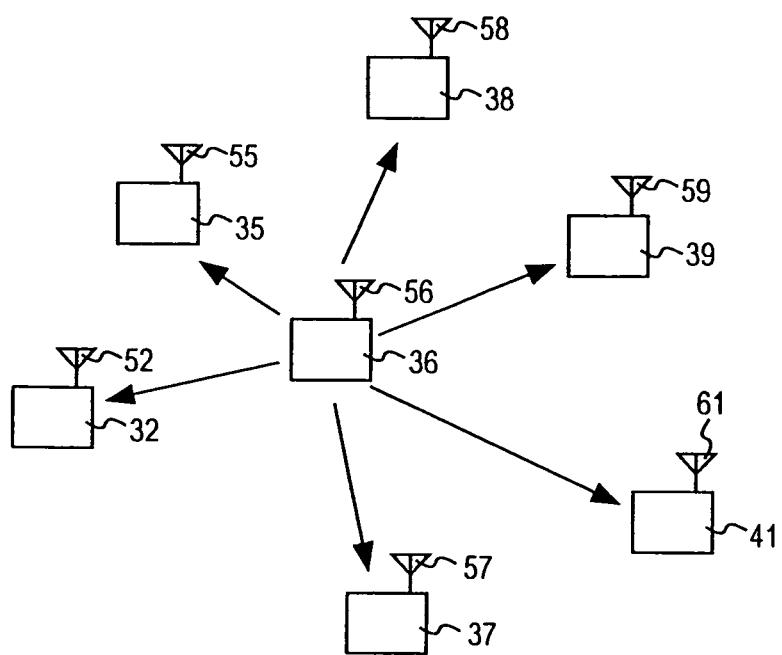

FIGS. 8A and 8B illustrate how to detect data delivery performance in each wireless interval.

(a1) Detection of Data Delivery Performance

First, it is explained how the actual data delivery performance is detected when data delivery performance consists of average received signal strength indicator RSSI_AVE.

In the OLSR protocol, as mentioned above, wireless devices 32, 35, 37, 38, 39, and 41 broadcast Hello messages including their self IP addresses periodically and wireless device 36 receives Hello messages from wireless devices 32, 35, 37, 38, 39, and 41 periodically (FIG. 8A).

Each time the wireless interface module 16 of wireless device 36 receives Hello messages from wireless devices 32, 35, 37, 38, 39, and 41, it detects the Hello messages' received signal strength indicators RSSI_32, RSSI_35, RSSI_37, RSSI_38, RSSI_39, and RSSI_41 and transfers the detected received signal strength indicators RSSI_32, RSSI_35, RSSI_37, RSSI_38, RSSI_39, and RSSI_41 to the routing daemon 24.

The routing daemon 24 of wireless device 36 receives the received signal strength indicators RSSI_32, RSSI_35, RSSI_37, RSSI_38, RSSI_39, and RSSI_41 from the wireless interface module 16. Then, the routing daemon 24 of wireless device 36 calculates average received signal strength indicator RSSI_AVE_32 from the plural received signal strength indicators RSSI_32 which it has received in a given period. Similarly the routing daemon 24 of wireless device 36 calculates average received signal strength indicators RSSI_AVE_35, RSSI_AVE_37, RSSI_AVE_38, RSSI_AVE_39, and RSSI_AVE_41 from the plural received signal strength indicators RSSI_35, plural received signal strength indicators RSSI_37, plural received signal strength indicators RSSI_38, plural received signal strength indicators RSSI_39, and plural received signal strength indicators RSSI_41, respectively.

Then the routing daemon 24 of wireless device 36 generates a Hello message HLOM including the average received signal strength indicators RSSI_AVE_32, RSSI_AVE_35, RSSI_AVE_37, RSSI_AVE_38, RSSI_AVE_39, and RSSI_AVE_41 and its self IP address, IP address 36, and broadcasts it (FIG. 8B).

The routing daemons 24 of wireless devices 32, 35, 37, 38, 39, and 41 receive the Hello message HLOM from wireless device 36. The routing daemon 24 of wireless device 32 detects the average received signal strength indicator RSSI_AVE_32 and IP address IP address 36 from the received Hello message HLOM and, based on the detected average received signal strength indicator RSSI_AVE_32 and IP address IP address 36, detects the performance of data delivery to wireless device 36 (i.e. average received signal strength indicator RSSI_AVE_32) in packet transmission from wireless device 32 to wireless device 36. Similarly, the routing daemons 24 of wireless devices 35, 37, 38, 39, and 41 detect the performance of data delivery to wireless device 36 in transmission of packets from wireless devices 35, 37, 38, 39, and 41 to wireless device 36 (i.e. average received signal strength indicators RSSI_AVE_35, RSSI_AVE_37, RSSI_AVE_38, RSSI_AVE_39, and RSSI_AVE_41).

Upon detecting the performance of data delivery to wireless device 36 (i.e. average received signal strength indicators RSSI_AVE_32, RSSI_AVE_35, RSSI_AVE_37, RSSI_AVE_38, RSSI_AVE_39, and RSSI_AVE_41), the routing daemons 24 of wireless devices 32, 35, 37, 38, 39, and 41 transfer the detected performance of data delivery to wireless device 36 (i.e. average received signal strength indicators RSSI_AVE_32, RSSI_AVE_35, RSSI_AVE_37, RSSI_AVE_38, RSSI_AVE_39, and RSSI_AVE_41) to the IP module 20. Then the IP modules 20 of wireless devices 32, 35, 37, 38, 39, and 41 acquire the performance of data delivery to wireless device 36 from wireless devices 32, 35, 37, 38, 39, and 41 (i.e. average received signal strength indicators RSSI_AVE_32, RSSI_AVE_35, RSSI_AVE_37, RSSI_AVE_38, RSSI_AVE_39, and RSSI_AVE_41) respectively. In other words, the IP modules 20 of wireless devices 32, 35, 37, 38, 39, and 41 respectively acquire the data delivery performance for the following wireless intervals: wireless device 32 to wireless device 36; wireless device 35 to wireless device 36; wireless device 37 to wireless device 36; wireless device 38 to wireless device 36; wireless device 39 to wireless device 36; and wireless device 41 to wireless device 36.

Furthermore, the routing daemons 24 of wireless devices 32, 35, 37, 38, 39, and 41 generate Hello messages including the detected performance of data delivery to wireless device 36 (i.e. average received signal strength indicators RSSI_AVE_32, RSSI_AVE_35, RSSI_AVE_37, RSSI_AVE_38, RSSI_AVE_39, and RSSI_AVE_41) and the IP addresses of wireless devices 32, 35, 37, 38, 39, and 41 and broadcast them. Consequently the IP modules 20 of other wireless devices 31, 33, 34, 36, 40, 42, and 43 acquire the data delivery performances for the following wireless intervals between each wireless device and wireless device 36: wireless device 32 to wireless device 36; wireless device 35 to wireless device 36; wireless devices 37 to wireless device 36; wireless device 38 to wireless device 36; wireless device 39 to wireless device 36; and wireless device 41 to wireless device 36.

When the routing daemon 24 of wireless device 36 calculates average received signal strength indicators RSSI_AVE_32, RSSI_AVE_35, RSSI_AVE_37, RSSI_AVE_38, RSSI_AVE_39, and RSSI_AVE_41 from the Hello messages sent from wireless devices 32, 35, 37, 38, 39, and 41, preferably it should calculate RSSI_AVE_32, RSSI_AVE_35, RSSI_AVE_37, RSSI_AVE_38, RSSI_AVE_39, and RSSI_AVE_41, taking the number of packets which wireless device 36 has received from wireless devices 32, 35, 37, 38, 39, and 41 into consideration. If the number of received packets is relatively small, the reliability of calculated average received signal strength indicators RSSI_AVE_32, RSSI_AVE_35, RSSI_AVE_37, RSSI_AVE_38, RSSI_AVE_39, and RSSI_AVE_41 is relatively low; on the other hand, if the number of received packets is relatively large, the reliability of calculated average received signal strength indicators RSSI_AVE_35, RSSI_AVE_37, RSSI_AVE_38, RSSI_AVE_39, and RSSI_AVE_41 is relatively high.

Hence, preferably, when the number of packets received from wireless devices 32, 35, 37, 38, 39 and 41 (i.e. the number of received Hello messages) reaches a fixed value (i.e. the number of received packets (number of received Hello messages) to ensure the reliability of average received signal strength indicators RSSI_AVE_32, RSSI_AVE_35, RSSI_AVE_37, RSSI_AVE_38, RSSI_AVE_39, and RSSI_AVE_41), the routing daemon 24 of wireless device 36 should calculate average received signal strength indicators RSSI_AVE_32, RSSI_AVE_35, RSSI_AVE_37, RSSI_AVE_38, RSSI_AVE_39, and RSSI_AVE_41.

Consequently, the IP modules 20 of wireless devices 32, 35, 37, 38, 39, and 41 acquire reliable information on data delivery performance (i.e. average received signal strength indicators RSSI_AVE_32, RSSI_AVE_35, RSSI_AVE_37, RSSI_AVE_38, RSSI_AVE_39, and RSSI_AVE_41).

Through the above sequence, the IP modules 20 of wireless devices 31, 33, 34, 36, 40, 42, and 43 constituting the wireless network 100 also acquire the performance of data delivery from wireless devices 31, 33, 34, 36, 40, 42, and 43 to neighbor wireless devices and the routing daemons 24 of wireless devices 31, 33, 34, 36, 40, 42, and 43 generate Hello messages including the performance of data delivery from wireless devices 31, 33, 34, 36, 40, 42, and 43 to neighbor wireless devices and the IP addresses of wireless devices 31, 33, 34, 36, 40, 42, and 43 respectively and broadcast them. Consequently the IP modules 20 of wireless devices 31-43 constituting the wireless network 100 each acquire the data delivery performance information (i.e. average received signal strength indicators RSSI_AVE) for all the wireless intervals of the wireless network 100.

(b1) Determination of Maximum Transmission Rate maxRate

Figures 9, 10:
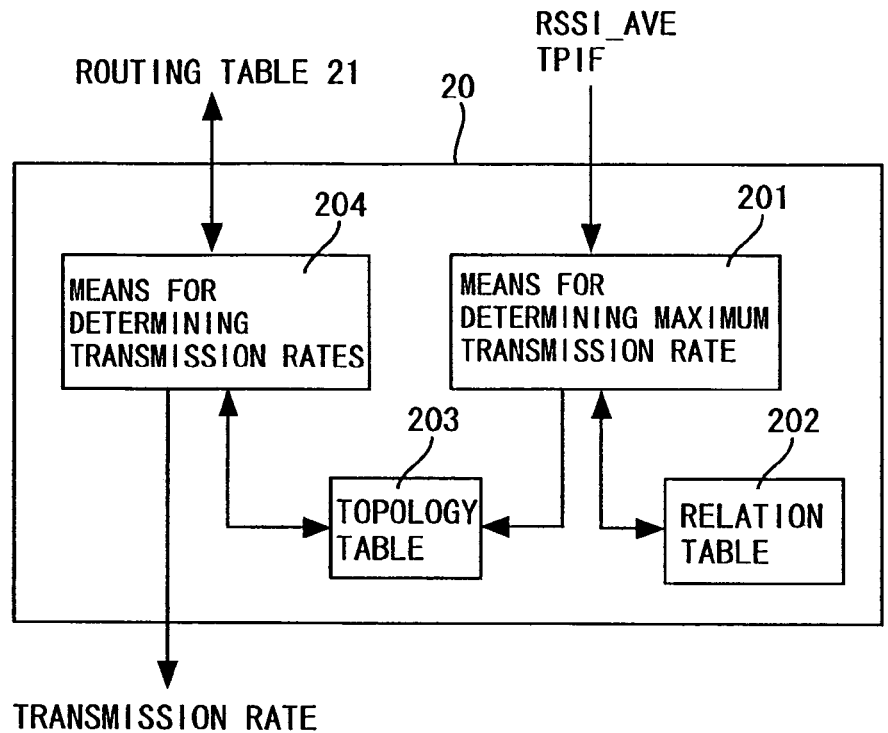
FIG. 9 is a functional block diagram showing, among the functions of the IP module shown in FIG. 2, the function of determining transmission rates.
FIG. 10 shows the structure of the relation table shown in FIG. 9.

FIG. 9 is a functional block diagram showing, among the functions of the IP module 20 shown in FIG. 2, the function of determining transmission rates. The IP module 20 includes a means for determining maximum transmission rate 201, a relation table 202, a topology table 203, and a means for determining transmission rates 204.

The means for determining maximum transmission rate 201 receives data delivery performance information (average received signal strength indicators RSSI_AVE) for all the wireless intervals of the wireless network 100 and the topology information TPIF from the routing daemon 24 and determines maximum transmission rate maxRate for each wireless interval according to the data delivery performance (i.e. average received signal strength indicators RSSI_AVE) and the relation table 202. Then the means for determining maximum transmission rate 201 adds the determined maximum transmission rates maxRate to the topology information TPIF to create a topology table 203.

The relation table 202 holds the relation between average received signal strength indicator RSSI_AVE and standard transmission rate. The topology table 203 consists of topology information TPIF of wireless devices 31-43 of the wireless network 100 and maximum transmission rates maxRate for the wireless intervals.

The means for determining transmission rates 204 determines the packet transmission route by reference to the routing table 21 and extracts maximum transmission rate maxRate for plural wireless intervals on the determined transmission route by reference to the topology table 203 and determines the transmission rate txRate of the wireless device in which the means is mounted, according to the extracted maximum transmission rate maxRate for the plural wireless intervals. The means for determining transmission rates 204 transfers the determined transmission rate txRate to the MAC module 17.

FIG. 10 shows the structure of the relation table 202 shown in FIG. 9. The relation table 202 consists of average received signal strength indicators RSSI_AVE and standard transmission rates. The average received signal strength indicators RSSI_AVE and standard transmission rates are related with each other. More specifically, standard transmission rate 6 Mbps corresponds to average received signal strength indicators lower than −85 dB. Standard transmission rates 9 Mbps, 12 Mbps, 18 Mbps, 24 Mbps, 36 Mbps, 48 Mbps, and 54 Mbps respectively correspond to the following ranges of RSSI_AVE: −85 to 82 dB, −82 to −80 dB, −80 to −78 dB, −78 to 75 dB, −75 to −72 dB, −72 dB to −65 dB, −65 dB or higher.

Figure 11B:
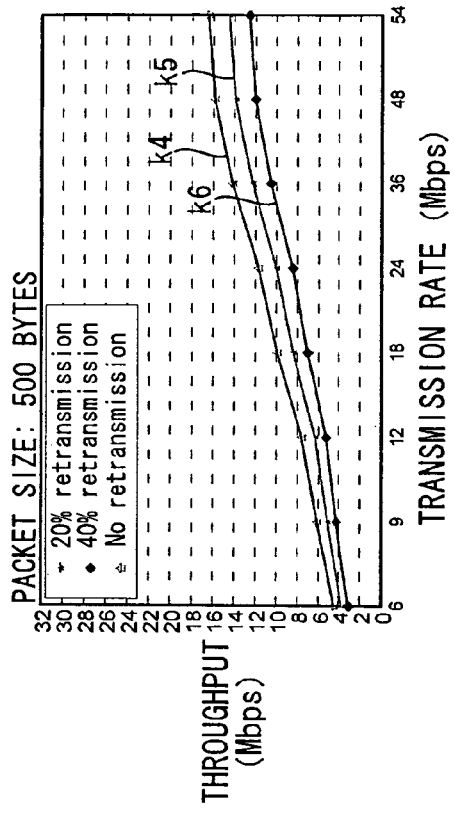
Figure 11D:
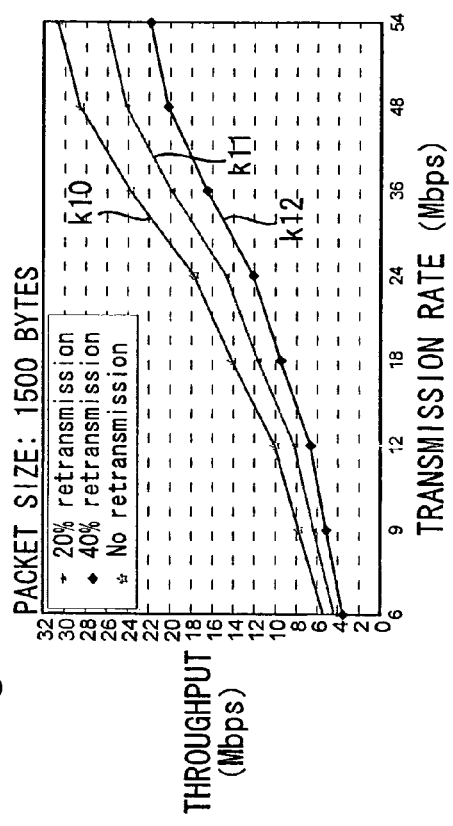
Figure 11A:
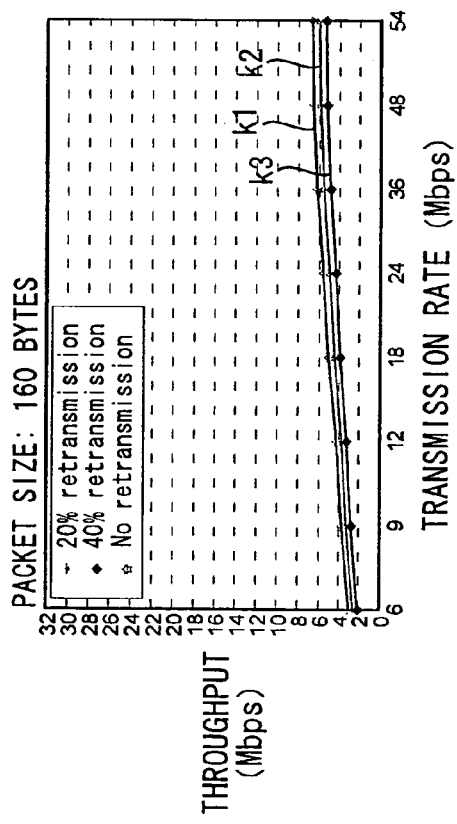
Figure 11C:
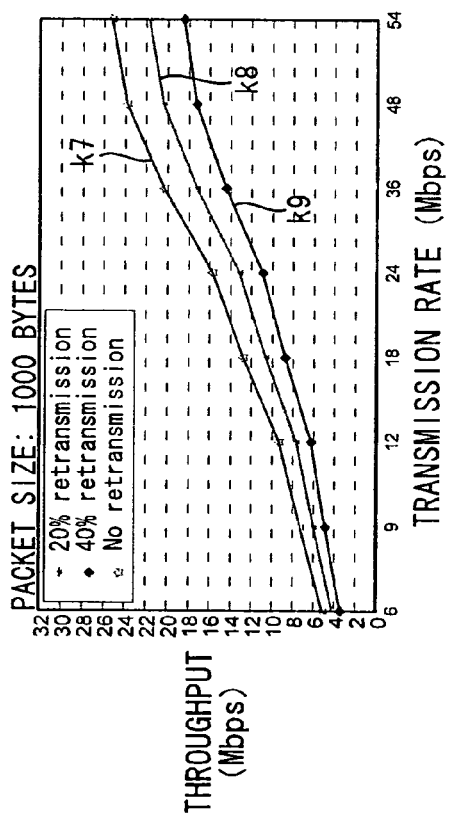

FIGS. 11A to 11D show relations between throughput and transmission rate. FIG. 11A shows the relation between throughput and transmission rate with a packet size of 160 bytes; FIG. 11B shows the relation between throughput and transmission rate with a packet size of 500 bytes; FIG. 11C shows the relation between throughput and transmission rate with a packet size of 1000 bytes; and FIG. 11D shows the relation between throughput and transmission rate with a packet size of 1500 bytes.

In FIGS. 11A to 11D, the vertical axis represents throughput and the horizontal axis represents transmission rate. Curves k1, k4, k7, and k10 express throughput versus transmission rate characteristics without packet retransmission; curves k2, k5, k8, and k11 express throughput versus transmission rate characteristics with a packet retransmission rate of 20%; and curves k3, k6, k9, and k12 express throughput versus transmission rate characteristics with a packet retransmission rate of 40%.

When the packet size is 160 bytes, the transmission rate's influence on throughput is small and when the packet sizes are larger (500 bytes, 1000 bytes and 1500 bytes), the transmission rate's influence on throughput is larger.

When the packet size is 160 bytes, throughput with packet retransmission taken into consideration is higher than throughput without packet retransmission in the following case: throughput with 20% retransmission at 18 Mbps or more or with 40% retransmission at 36 Mbps or more is higher than throughput without retransmission at 12 Mbps (curves k1 to k3).

When the packet size is 500 bytes, throughput with packet retransmission taken into consideration is higher than throughput without packet retransmission in the following case: throughput with 20% retransmission at 18 Mbps or more or with 40% retransmission at 24 Mbps or more is higher than throughput without retransmission at 12 Mbps (curves k4 to k6). Also, when the packet size is 1000 bytes, throughput with packet retransmission taken into consideration is higher than throughput without packet retransmission in the following case: throughput with 20% retransmission at 18 Mbps or more or with 40% retransmission at 24 Mbps or more is higher than throughput without retransmission at 12 Mbps (curves k7 to k9). Also, when the packet size is 1500 bytes, throughput with packet retransmission taken into consideration is higher than throughput without packet retransmission in the following case: throughput with 20% retransmission at 18 Mbps or more or with 40% retransmission at 24 Mbps or more is higher than throughput without retransmission at 12 Mbps (curves k10 to k12).

As the packet size becomes larger, throughput becomes much better, whether packets are retransmitted or not.

This means that when the packet size is relatively large, packet transmission at higher transmission rates is advantageous, and when the packet size is relatively small, packet transmission at lower transmission rates is advantageous because packet loss increases at higher transmission rates.

The means for determining maximum transmission rate 201 receives the data delivery performance (i.e. average received signal strength indicators RSSI_AVE) for each wireless interval from the routing daemon 24 and determines maximum transmission rate maxRate for each wireless interval by referring to the relation table 202 and carrying out weighting by packet size.

More specifically, the means for determining maximum transmission rate 201 determines maximum transmission rate maxRate to be 54 Mbps if the data delivery performance (i.e. average received signal strength indicator RSSI_AVE) received from the routing daemon 24 is −70 dB or more and the packet size is 1500 bytes. Although the relation table 202 indicates that the standard transmission rate for average received signal strength indicator RSSI_AVE of −70 dB or more is 48 Mbps, for packets of 1500 bytes, higher rates are advantageous in spite of increased packet loss as described above and if average received signal strength indicator RSSI_AVE of −70 dB or more is attained though it is lower than RSSI_AVE of −65 dB or more, the means for determining maximum transmission rate 201 selects 54 Mbps as maximum transmission rate maxRate.

On the other hand, the means for determining maximum transmission rate 201 determines maximum transmission rate maxRate to be 54 Mbps if the data delivery performance (i.e. average received signal strength indicator RSSI_AVE) received from the routing daemon 24 is −60 dB or more and the packet size is 160 bytes. Although the relation table 202 indicates that the standard transmission rate for average received signal strength indicator RSSI_AVE of −65 dB or more is 54 Mbps, for packets of 160 bytes, lower rates are advantageous to avoid packet loss as described above and if average received signal strength indicator RSSI_AVE of −60 dB or more, which is higher than RSSI_AVE of −65 dB, is attained, the means for determining maximum transmission rate 201 selects 54 Mbps as maximum transmission rate maxRate.

In this way, the means for determining maximum transmission rate 201 determines maximum transmission rate maxRate for each wireless interval by referring to data delivery performance (average received signal strength indicators RSSI_AVE) and the relation table 202 and carrying out weighting by packet size.

Maximum Transmission Rate Determination Method 2

In Maximum Transmission Rate Determination Method 2, data delivery performance consists of average received signal strength indicator RSSI_AVE and packet loss rate PKT_LOSS.

(a2) Detection of Data Delivery Performance

When each of wireless devices 32, 35, 37, 38, 39, and 41 acquires the data delivery performance (average received signal strength indicator RSSI_AVE and packet loss rate PKT_LOSS) in transmission of a Hello packet from itself to wireless device 36, it transmits the Hello packet at varying transmission rates. More specifically, the IP modules 20 of wireless devices 32, 35, 37, 38, 39, and 41 transfer a plurality of transmission rates for transmission of Hello packets to the MAC module 17 successively. The MAC modules 17 of wireless devices 32, 35, 37, 38, 39, and 41 transmit the Hello packets at the transmission rates received from the IP modules.

In this case, the IP modules of wireless devices 32, 35, 37, 38, 39, and 41 change the transmission rate successively by the following three methods.

(MTH1)

MTH1 is a method in which the transmission rate is changed periodically. Specifically, in Method MTH1, the transmission rate is changed in the following order: . . . , 54 Mbps, 6 Mbps, 48 Mbps, 9 Mbps, 36 Mbps, 12 Mbps, 24 Mbps, 18 Mbps, 54 Mbps, 6 Mbps, 48 Mbps, 9 Mbps, 36 Mbps, 12 Mbps, 24 Mbps, 18 Mbps, . . . . In other words, in MTH1, the transmission rate is changed successively in cycles where each cycle consists of 54 Mbps, 6 Mbps, 48 Mbps, 9 Mbps, 36 Mbps, 12 Mbps, 24 Mbps, and 18 Mbps in the order of mention.

MTH1 offers the advantage that the packet loss rate PKT_LOSS at all transmission rates can be relatively quickly measured.

(MTH2)

MTH2 is a method in which a base rate is added periodically. In Method MTH2, assuming that 6 Mbps is used as the base rate, the transmission rate is changed in the following order: . . . , 54 Mbps, 6 Mbps, 48 Mbps, 6 Mbps, 36 Mbps, 6 Mbps, 24 Mbps, 6 Mbps, 18 Mbps, 6 Mbps, 12 Mbps, 6 Mbps, 9 Mbps, 6 Mbps; or . . . , 54 Mbps, 9 Mbps, 6 Mbps, 48 Mbps, 12 Mbps, 6 Mbps, 36 Mbps, 18 Mbps, 6 Mbps, 24 Mbps, 6 Mbps, . . . . In other words, in MTH2, the transmission rate is changed successively so that the Hello packet is transmitted at the base rate (6 Mbps) always after being transmitted at one or more transmission rates higher than the base rate (6 Mbps).

The method MTH2 offers the advantage that each wireless interval is established stably because Hello packet transmission at the base rate (6 Mbps) occurs periodically.

(MTH3)

MTH3 is a method in which high transmission rates are mixed gradually. Specifically, in Method MTH3, the transmission rate is changed in the following order: . . . , 6 Mbps, 6 Mbps, 6 Mbps, . . . , 6 Mbps, 9 Mbps, 6 Mbps, . . . , 6 Mbps, 12 Mbps, 6 Mbps, 9 Mbps, 6 Mbps, . . . , 6 Mbps, 54 Mbps, 6 Mbps, 48 Mbps, 6 Mbps, 36 Mbps, . . . , 9 Mbps, 6 Mbps, . . . .

In other words, in Method MTH3, the transmission rate is dynamically changed according to the measured packet loss rate PKT_LOSS. More specifically, in MTH3, when the packet loss rate PKT_LOSS is relatively low, a high transmission rate is added and when the packet loss rate PKT_LOSS is relatively high, a low transmission rate is added.

In addition, in MTH3, when plural wireless devices exist, the transmission rate is dynamically changed according to the average, medium, minimum and maximum packet loss rates or the packet loss rate for an important wireless interval (wireless interval where a set of MPRs exists). Which value is adopted depends on system characteristics and a combination of these values may also be used.

The method MTH3 is advantageous in that each wireless interval is established stably and also the packet loss rate PKT_LOSS at the minimum necessary transmission rate can be measured. Also, by changing the packet length used to measure packet loss rate PKT_LOSS, a higher measurement precision is achieved and maximum transmission rate maxRate is determined with higher accuracy.

Plural usable transmission rates are determined depending on the communication protocol in use. If IEEE802.11a is used as the communication protocol, the plural transmission rates are 6 Mbps (base rate), 9 Mbps, 12 Mbps, 18 Mbps, 24 Mbps, 36 Mbps, 48 Mbps, and 54 Mbps. If IEEE802.11b is used as the communication protocol, the plural transmission rates are 1 Mbps (base rate), 2 Mbps, 5.5 Mbps, and 11 Mbps. If IEEE802.11g is used as the communication protocol, the plural transmission rates are 1 Mbps (base rate), 2 Mbps, 5.5 Mbps, 11 Mbps, 6 Mbps, 9 Mbps, 12 Mbps, 18 Mbps, 24 Mbps, 36 Mbps, 48 Mbps, and 54 Mbps.

Hence, in wireless devices 32, 35, 37, 38, 39, and 41, the IP module changes the transmission rate to different transmission rates successively by one of the above three methods MTH1 to MTH3 and the MAC module 17 transmits the Hello packet at the changed transmission rates. In wireless device 36, the wireless interface module 16 receives Hello packets from wireless devices 32, 35, 37, 38, 39, and 41 and detects the Hello packets' received signal strength indicators RSSI_32, RSSI_35, RSSI_37, RSSI_38, RSSI_39, and RSSI_41 and transfers the received signal strength indicators RSSI_32, RSSI_35, RSSI_37, RSSI_38, RSSI_39, and RSSI_41 to the routing daemon 24.

The routing daemon 24 of wireless device 36 receives the Hello packets and received signal strength indicators RSSI_32, RSSI_35, RSSI_37, RSSI_38, RSSI_39, and RSSI_41 from the wireless interface module 16. Then, the routing daemon 24 of wireless device 36 calculates average received signal strength indicator RSSI_AVE_32 from plural received signal strength indicators RSSI_32 which it has received in a given period. Similarly the routing daemon 24 of wireless device 36 calculates average received signal strength indicators RSSI_AVE_35, RSSI_AVE_37, RSSI_AVE_38, RSSI_AVE_39, and RSSI_AVE_41 from plural received signal strength indicators RSSI_35, plural received signal strength indicators RSSI_37, plural received signal strength indicators RSSI_38, plural received signal strength indicators RSSI_39, and plural received signal strength indicators RSSI_41, respectively.

In addition, the routing daemon 24 of wireless device 36 detects packet loss rates PKT_LOSS_32, PKT_LOSS_35, PKT_LOSS_37, PKT_LOSS_38, PKT_LOSS_39, and PKT_LOSS_41 at each transmission rate from the plural Hello packets received periodically from wireless devices 32, 35, 37, 38, 39, and 41 in a given period.

Then the routing daemon 24 of wireless device 36 generates a Hello packet HELO including the average received signal strength indicators RSSI_AVE_32, RSSI_AVE_35, RSSI_AVE_37, RSSI_AVE_38, RSSI_AVE_39, and RSSI_AVE_41, packet loss rates PKT_LOSS_32, PKT_LOSS_35, PKT_LOSS_37, PKT_LOSS_38, PKT_LOSS_39, and PKT_LOSS_41 at each transmission rate, IP addresses of wireless devices 32, 35, 37, 38, 39, and 41, and IP address of wireless device 36 and broadcasts it.

The routing daemon 24 of wireless device 32 receives the Hello packet HELO from wireless device 36 and detects the average received signal strength indicator RSSI_AVE_32 and packet loss rate PKT_LOSS_32 at each transmission rate from the received Hello packet HELO. Then, in wireless device 32, the routing daemon 24 transfers the detected average received signal strength indicator RSSI_AVE_32 and packet loss rate PKT_LOSS_32 at each transmission rate to the IP module 20 which thus acquires the average received signal strength indicator RSSI_AVE_32 and packet loss rate PKT_LOSS_32 at each transmission rate. Similarly, the IP modules 20 of wireless devices 35, 37, 38, 39, and 41 acquire the average received signal strength indicator RSSI_AVE_35 and packet loss rate PKT_LOSS_35 at each transmission rate, average received signal strength indicator RSSI_AVE_37 and packet loss rate PKT_LOSS_37 at each transmission rate, average received signal strength indicator RSSI_AVE_38 and packet loss rate PKT_LOSS_38 at each transmission rate, average received signal strength indicator RSSI_AVE_39 and packet loss rate PKT_LOSS_39 at each transmission rate, and average received signal strength indicator RSSI_AVE_41 and packet loss rate PKT_LOSS_41 at each transmission rate, respectively.

Since wireless devices 31, 33, 34, 40, 42, and 43 also receive the Hello packet HELO broadcast from wireless device 36, the IP modules of wireless devices 31, 33, 34, 40, 42, and 43 acquire the average received signal strength indicator RSSI_AVE_32 and packet loss rate PKT_LOSS_32 at each transmission rate, average received signal strength indicator RSSI_AVE_35 and packet loss rate PKT_LOSS_35 at each transmission rate, average received signal strength indicator RSSI_AVE_37 and packet loss rate PKT_LOSS_37 at each transmission rate, average received signal strength indicator RSSI_AVE_38 and packet loss rate PKT_LOSS_38 at each transmission rate, average received signal strength indicator RSSI_AVE_39 and packet loss rate PKT_LOSS_39 at each transmission rate, and average received signal strength indicator RSSI_AVE_41 and packet loss rate PKT_LOSS_41 at each transmission rate, in transmission of Hello packets from wireless devices 32, 35, 37, 38, 39, and 41 to wireless device 36.

Through the above sequence, the IP modules 20 of wireless devices 31, 33, 34, 36, 40, 42, and 43 also acquire the performance of data delivery from wireless devices 31, 33, 34, 36, 40, 42, and 43 to neighbor wireless devices (average received signal strength indicators and packet loss rates PKT_LOSS at each transmission rate) and broadcast the data delivery performance information throughout the wireless network 100.

Consequently the IP modules 20 of wireless devices 31-43 constituting the wireless network 100 each acquire the data delivery performance information (average received signal strength indicators RSSI_AVE and packet loss rates PKT_LOSS at each transmission rate) for all the wireless intervals of the wireless network 100.

(b2) Determination of Maximum Transmission Rate maxRate

When the data delivery performance consists of average received signal strength indicator RSSI_AVE and packet loss rate PKT_LOSS at each transmission rate, the means for determining maximum transmission rate 201 receives topology information TPIF and average received signal strength indicators RSSI_AVE from the routing daemon 24 and receives packet loss rates PKT_LOSS at each transmission rate from the MAC module 17. The means for determining maximum transmission rate 201 holds four relation graphs as shown in FIGS. 11A to 11D when it uses Determination Method 2 to determine maximum transmission rate maxRate.

Figure 12A:
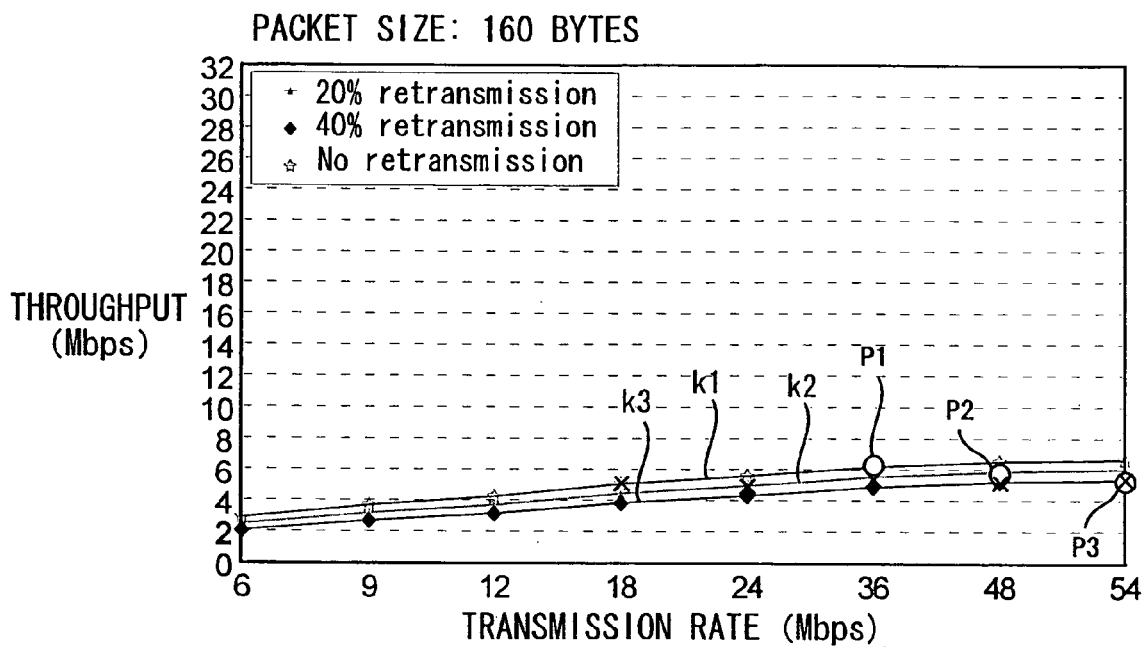
Figure 12B:
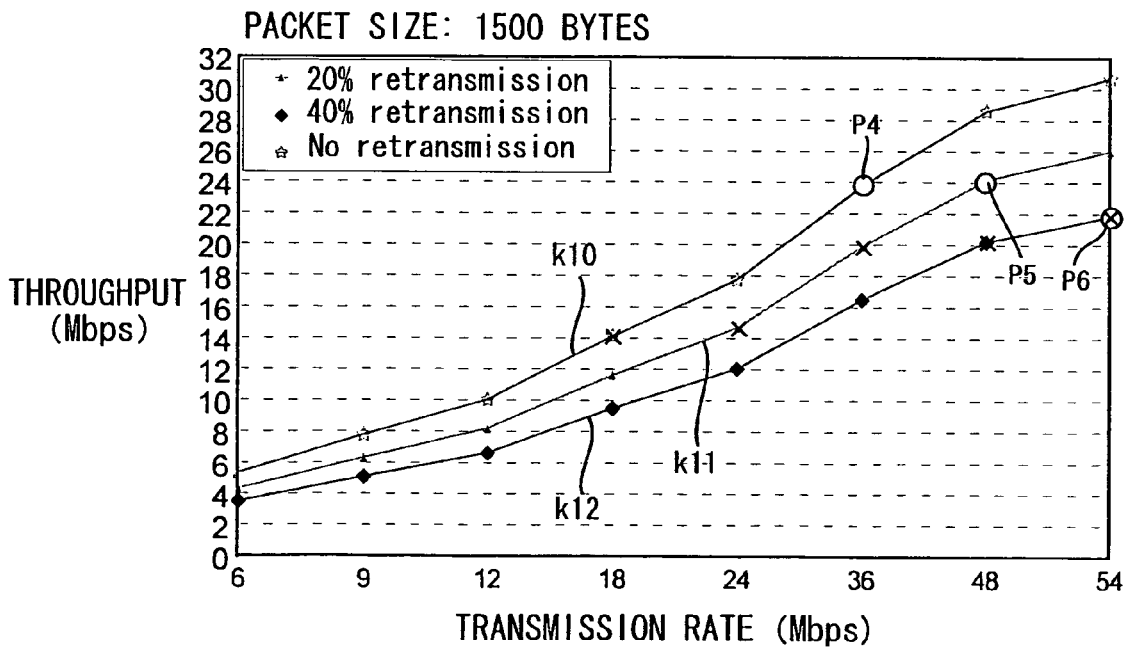

FIGS. 12A and 12B illustrate how maximum transmission rate maxRate is determined by Determination Method 2. Upon acquiring topology information TPIF, average received signal strength indicators RSSI_AVE and packet loss rates PKT_LOSS at each transmission rate, the means for determining maximum transmission rate 201 detects the standard transmission rate txRate_STD corresponding to the average received signal strength indicators RSSI_AVE, by reference to the relation table 202. In this case, let's say that the means for determining maximum transmission rate 201 detects 48 Mbps as standard transmission rate txRate_STD.

Then, the means for determining maximum transmission rate 201 plots the relation between transmission rate and packet loss rate PKT_LOSS around the detected standard transmission rate txRate_STD on throughput versus transmission rate characteristic curves with different packet sizes (FIGS. 11A to 11D). In this case, for example, the means for determining maximum transmission rate 201 plots P1 which represents 36 Mbps (transmission rate) and "0" (packet loss rate PKT_LOSS), P2 which represents 48 Mbps (transmission rate) and "20%" (packet loss rate PKT_LOSS), and P3 which represents 54 Mbps (transmission rate) and "40%" (packet loss rate PKT_LOSS).

More specifically, when the packet size is 160 bytes, the means for determining maximum transmission rate 201 plots P1 to P3 representing transmission rates 36 Mbps, 48 Mbps, and 54 Mbps and packet loss rates 0%, 20% and 40% respectively on the throughput versus transmission rate curves (k1 to k3) shown in FIG. 11A (FIG. 12A). When the packet size is 1500 bytes, the means for determining maximum transmission rate 201 plots P4 to P6 representing transmission rates 36 Mbps, 48 Mbps, and 54 Mbps and packet loss rates 0%, 20% and 40% respectively on the throughput versus transmission rate curves (k10 to k12) shown in FIG. 11D (FIG. 12B). Since the retransmission rate in FIGS. 11A to 11D denotes packet loss rate PKT_LOSS, "0" packet loss rate PKT_LOSS, "20%" packet loss rate PKT_LOSS, and "40%" packet loss rate PKT_LOSS correspond to no retransmission, 20% retransmission, and 40% retransmission, respectively.

Upon plotting transmission rate and packet loss rate PKT_LOSS curves around the standard transmission rate txRate_STD corresponding to the average received signal strength indicators RSSI_AVE, the means for determining maximum transmission rate 201 determines maximum transmission rate maxRate at which throughput is the highest, from the plotted curves. More specifically, in case of the packet size of 160 bytes, the means for determining maximum transmission rate 201 determines 36 Mbps to be maximum transmission rate maxRate because throughput is the highest with "0" packet loss rate PKT_LOSS at 36 Mbps. Also, in case of the packet size of 1500 bytes, the means for determining maximum transmission rate 201 determines 48 Mbps as maximum transmission rate maxRate because throughput is the highest with "20%" packet loss rate PKT_LOSS at 48 Mbps.

When the average received signal strength indicator RSSI_AVE is −73 dB and the packet loss rates PKT_LOSS at 18 Mbps, 24 Mbps, 36 Mbps, 48 Mbps, and 54 Mbps are 0%, 20%, 20%, 40%, and 40% respectively, the standard transmission rate txRate_STD corresponding to −73 dB average received signal strength indicator RSSI_AVE is 36 Mbps (FIG. 10). The above relations between transmission rate and packet loss rate PKT_LOSS around the standard transmission rate txRate_STD (36 Mbps) are expressed as X marks on the throughput versus transmission rate curves as shown in FIGS. 12A and 12B.

As a consequence, when the packet size is 160 bytes, throughput is approximately 5 Mbps at 18 Mbps, 36 Mbps, and 54 Mbps transmission rates. Hence, in case of the packet size of 160 bytes, these transmission rates do not make much difference in throughput and 18 Mbps is selected as maximum transmission rate maxRate.

On the other hand, when the packet size is 1500 bytes, throughput is 14 Mbps, 20 Mbps, and 22 Mbps at 18 Mbps, 36 Mbps, and 54 Mbps transmission rates respectively.

Here, since throughput is the highest at 54 Mbps transmission rate though the packet loss rate PKT_LOSS is as high as 40%, 54 Mbps is selected as maximum transmission rate maxRate.

As explained above, when the packet size is large, throughput is higher at higher transmission rates even if packet loss rate PKT_LOSS is high and therefore a relatively high transmission rate is selected as maximum transmission rate maxRate.

When the packet size is 500 bytes or 1000 bytes, the means for determining maximum transmission rate 201 adds transmission rate versus packet loss rate PKT_LOSS characteristics around the standard transmission rate txRate_STD corresponding to the average received signal strength indicator RSSI_AVE, to the throughput versus transmission rate curves (k4 to k6 and k7 to k9) shown in FIGS. 11B and 11C and determines maximum transmission rate maxRate for each wireless interval with the above procedure.

As explained above, in Determination Method 2, the transmission rate at which throughput is the highest is selected as maximum transmission rate maxRate by reference to both the relation between throughput and transmission rate depending on packet size (FIGS. 11A to 11D) and the relation between transmission rate and packet loss rate PKT_LOSS (P1 to P6). Therefore, to determine maximum transmission rate maxRate by Determination Method 2 is equivalent to the process of determining maximum transmission rate maxRate which includes weighting by packet size.

Maximum Transmission Rate Determination Method 3

In Maximum Transmission Rate Determination Method 3, data delivery performance consists of average received signal strength indicator RSSI_AVE and received signal strength indicator RSSI standard deviation RSSI_DEV. In other words, in Maximum Transmission Rate Determination Method 3, data delivery performance consists of modified received signal strength indicator RSSI_modify. The modified received signal strength indicator RSSI_modify is determined by the equation given below.

(Equation 1)

$$\text{RSSI\_modify} = \text{RSSI\_AVE} - w\frac{\text{RSSI\_DEV}}{|\text{RSSI\_AVE}|} \quad (1)$$

In Equation 1, w denotes a weight for which the appropriate value is determined experimentally.

(a3) Detection of Data Delivery Performance

As shown in FIG. 8A, wireless devices 32, 35, 37, 38, 39, and 41 broadcast Hello messages including their self IP addresses periodically and wireless device 36 receives Hello messages from wireless devices 32, 35, 37, 38, 39, and 41 periodically.

Each time the wireless interface module 16 of wireless device 36 receives Hello messages from wireless devices 32, 35, 37, 38, 39, and 41, it detects the Hello messages' received signal strength indicators RSSI_32, RSSI_35, RSSI_37, RSSI_38, RSSI_39, and RSSI_41 and transfers the detected received signal strength indicators RSSI_32, RSSI_35, RSSI_37, RSSI_38, RSSI_39, and RSSI_41 to the routing daemon 24.

The routing daemon 24 of wireless device 36 receives the received signal strength indicators RSSI_32, RSSI_35, RSSI_37, RSSI_38, RSSI_39, and RSSI_41 from the wireless interface module 16. Then, the routing daemon 24 of wireless device 36 calculates average received signal strength indicator RSSI_AVE_32 and standard deviation RSSI_DEV of received signal strength indicator RSSI from plural received signal strength indicators RSSI_32 which it has received in a given period. Similarly the routing daemon 24 of wireless device 36 calculates average received signal strength indicators RSSI_AVE_35, RSSI_AVE_37, RSSI_AVE_38, RSSI_AVE_39, and RSSI_AVE_41 from plural received signal strength indicators RSSI_35, plural received signal strength indicators RSSI_37, plural received signal strength indicators RSSI_38, plural received signal strength indicators RSSI_39, and plural received signal strength indicators RSSI_41 as well as standard deviations RSSI_DEV_35, RSSI_DEV_37, RSSI_DEV_38, RSSI_DEV_39, and RSSI_DEV_41 of received signal strength indicators RSSI_35, RSSI_37, RSSI_38, RSSI_39, and RSSI_41, respectively.

Then the routing daemon 24 of wireless device 36 generates a Hello message HLOM including the average received signal strength indicators RSSI_AVE_32, RSSI_AVE_35, RSSI_AVE_37, RSSI_AVE_38, RSSI_AVE_39, and RSSI_AVE_41 as well as RSSI standard deviations RSSI_DEV_32, RSSI_DEV_35, RSSI_DEV_37, RSSI_DEV_38, RSSI_DEV_39, and RSSI_DEV_41 and its self IP address, IP address 36, and broadcasts it.

The routing daemons 24 of wireless devices 32, 35, 37, 38, 39, and 41 receive the Hello message HLOM from wireless device 36. The routing daemon 24 of wireless device 32 detects the average received signal strength indicator RSSI_AVE_32, RSSI standard deviation RSSI_DEV_32, and IP address 36 from the received Hello message and substitutes the detected average received signal strength indicator RSSI_AVE_32 and RSSI standard deviation RSSI_DEV_32 into Equation 1 to calculate modified received signal strength indicator RSSI_modify_32. Thus the routing daemon 24 of wireless device 32 detects the performance of data delivery to wireless device 36 (i.e. modified received signal strength indicator RSSI_modify_32) in packet transmission from wireless device 32 to wireless device 36. Similarly, the routing daemons 24 of wireless devices 35, 37, 38, 39, and 41 detect the performance of data delivery to wireless device 36 in transmission of packets from wireless devices 35, 37, 38, 39, and 41 to wireless device 36 (i.e. modified received signal strength indicators RSSI_modify_35, RSSI_modify_37, RSSI_modify_38, RSSI_modify_39, and RSSI_modify_41).

Upon detecting the performance of data delivery to wireless device 36 (i.e. modified received signal strength indicators RSSI_modify_32, RSSI_modify_35, RSSI_modify_37, RSSI_modify_38, RSSI_modify_39, and RSSI_modify_41), the routing daemons 24 of wireless devices 32, 35, 37, 38, 39, and 41 transfer the detected performance of data delivery to wireless device 36 (modified received signal strength indicators RSSI_modify_32, RSSI_modify_35, RSSI_modify_37, RSSI_modify_38, RSSI_modify_39, and RSSI_modify_41) to the IP module 20. Then the IP modules 20 of wireless devices 35, 37, 38, 39, and 41 acquire the performance of data delivery to wireless device 36 from wireless devices 35, 37, 38, 39, and 41 (i.e. modified received signal strength indicators RSSI_modify_32, RSSI_modify_35, RSSI_modify_37, RSSI_modify_38, RSSI_modify_39, and RSSI_modify_41) respectively.

Then, the data delivery performance (modified received signal strength indicators RSSI_modify_32, RSSI_modify_35, RSSI_modify_37, RSSI_modify_38, RSSI_modify_39, and RSSI_modify_41) is broadcast throughout the wireless network 100 in the same manner as in Maximum Transmission Rate Determination Method 1.

Through the above sequence, the IP modules 20 of wireless devices 31, 33, 34, 36, 40, 42, and 43 also acquire the performance of data delivery (modified received signal strength indicators RSSI_modify_31, RSSI_modify_33, RSSI_modify_34, RSSI_modify_36, RSSI_modify_40, RSSI_modify_42, and RSSI_modify_43) and this data delivery performance information is then broadcast throughout the wireless network 100 in the same manner as in Maximum Transmission Rate Determination Method 1.

Consequently the IP modules 20 of all wireless devices 31-43 of the wireless network 100 each acquire data delivery performance which consists of modified received signal strength indicators RSSI_modify for all the wireless intervals of the wireless network 100.

(b3) Determination of Maximum Transmission Rate maxRate

In Maximum Transmission Rate Determination Method 3, the means for determining maximum transmission rate 201 receives modified received signal strength indicators RSSI_modify from the routing daemon 24 and the relation table 202 holds the relation between modified received signal strength indicator RSSI_modify and standard transmission rate. In this case, "average received signal strength indicators" in the relation table 202 shown in FIG. 10 is replaced by "modified received signal strength indicators."

The means for determining maximum transmission rate 201, upon receiving the modified received signal strength indicator RSSI_modify from the routing daemon 24, detects standard transmission rate txRate_STD corresponding to the modified received signal strength indicator RSSI_modify by reference to the relation table 202. Then the means for determining maximum transmission rate 201 carries out weighting by packet size on the detected standard transmission rate txRate_STD in the same manner as in Maximum Transmission Rate Determination Method 1 and determines maximum transmission rate maxRate for each wireless interval.

Maximum Transmission Rate Determination Method 4

In Maximum Transmission Rate Determination Method 4, data delivery performance consists of modified received signal strength indicator RSSI_modify and packet loss rate PKT_LOSS.

(a4) Detection of Data Delivery Performance

Wireless devices 31-43 acquire packet loss rates PKT_LOSS at each transmission rate for all the wireless intervals of the wireless network 100 in the sequence described earlier in (a2) "Detection of Data Delivery Performance" and acquire modified received signal strength indicators RSSI_modify for all the wireless intervals of the wireless network 100 in the sequence described in (a3) "Detection of Data Delivery Performance." Consequently wireless devices 31-43 acquire data delivery performance which consists of modified received signal strength indicators RSSI_modify and packet loss rates PKT_LOSS at each transmission rate.

In Maximum Transmission Rate Determination Method 4, the means for determining maximum transmission rate 201 receives modified received signal strength indicators RSSI_modify and packet loss rates PKT_LOSS at each transmission rate from the routing daemon 24 and the relation table 202 holds the relation between modified received signal strength indicator RSSI_modify and standard transmission rate as explained above.

The means for determining maximum transmission rate 201, upon receiving the modified received signal strength indicator RSSI_modify from the routing daemon 24, detects the standard transmission rate txRate_STD corresponding to the modified received signal strength indicator RSSI_modify by reference to the relation table 202.

Then the means for determining maximum transmission rate 201 plots the relation between transmission rate and packet loss rate PKT_LOSS around the detected standard transmission rate txRate_STD on throughput versus transmission rate characteristic curves (FIGS. 11A to 11D) and determines maximum transmission rate maxRate for each wireless interval in the same way as described in (b2) "Determination of Maximum Transmission Rate maxRate" in Maximum Transmission Rate Determination Method 2. In other words, the means for determining maximum transmission rate 201, upon detecting the standard transmission rate txRate_ STD corresponding to the modified received signal strength indicator RSSI_modify, determines maximum transmission rates maxRate in the same way as described in (b2) "Determination of Maximum Transmission Rate maxRate."

Figure 13:
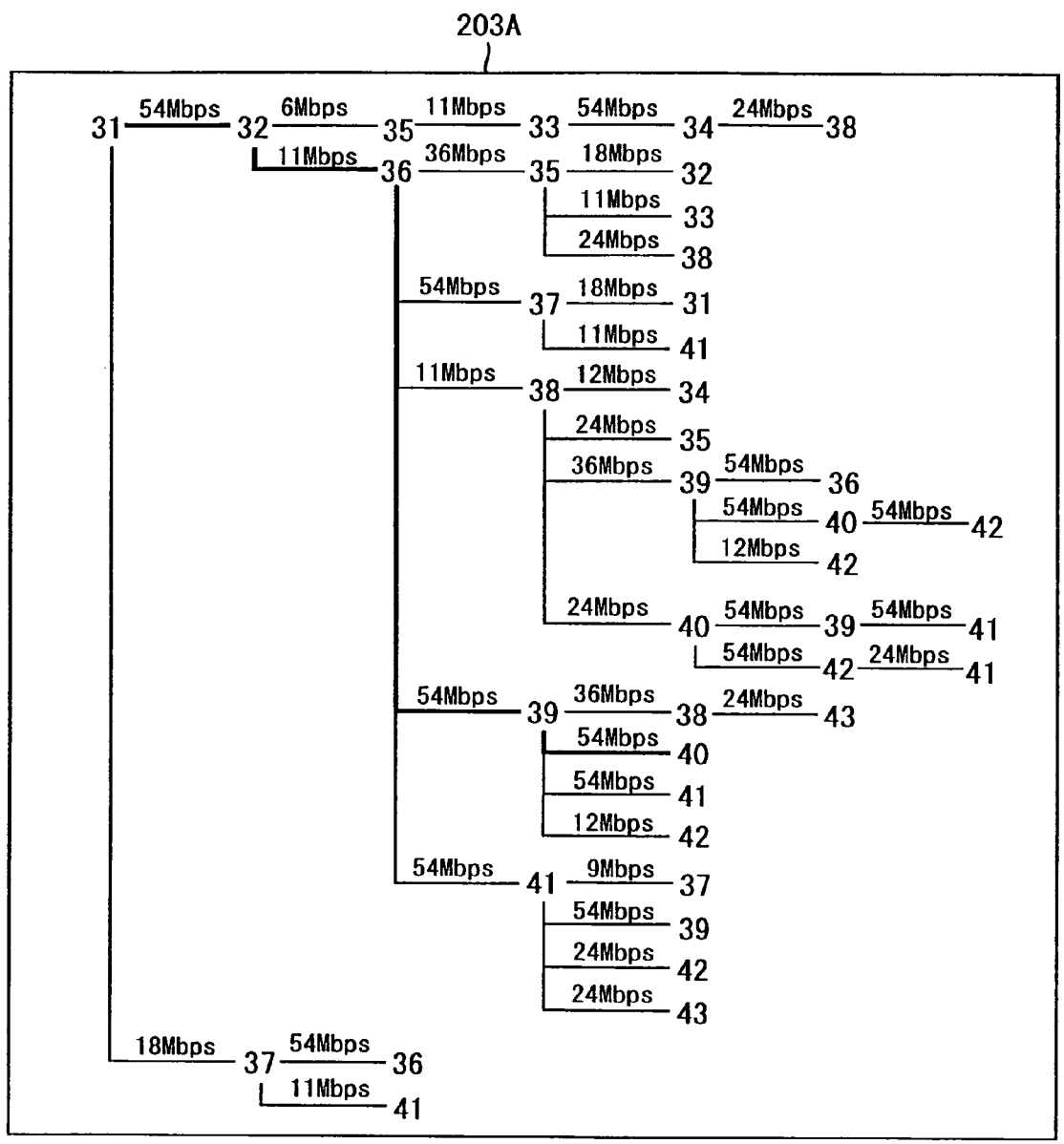
FIG. 13 shows an example of the topology table shown in FIG. 9.

FIG. 13 shows an example of the topology table 203 shown in FIG. 9. The means for determining maximum transmission rate 201, upon receiving the data delivery performance for each wireless interval of the wireless network 100 and topology information TPIF from the routing daemon 24, determines maximum transmission rate maxRate for each wireless interval by one of the above four methods and adds the determined maximum transmission rates maxRate to the topology information TPIF to create a topology table 203A (FIG. 13).

Figures 14, 15:
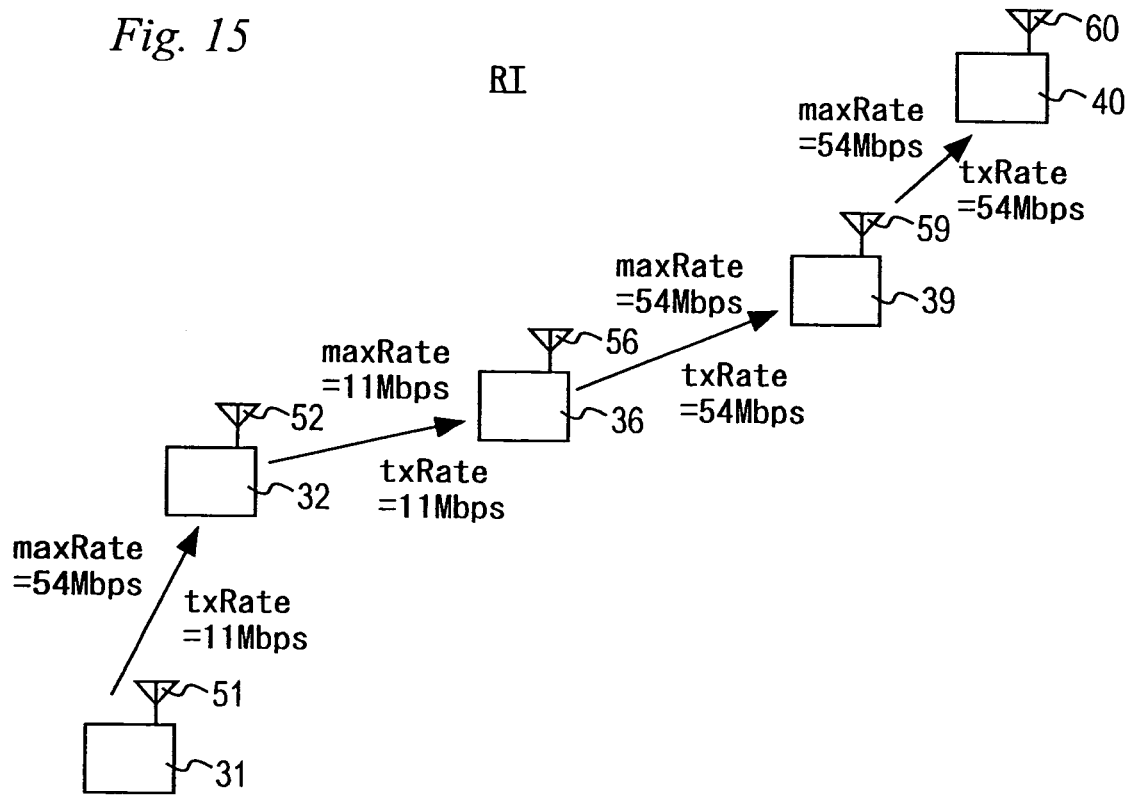
FIG. 14 shows an example of a routing table.
FIG. 15 shows an example of a wireless communication route.
Figure 16:
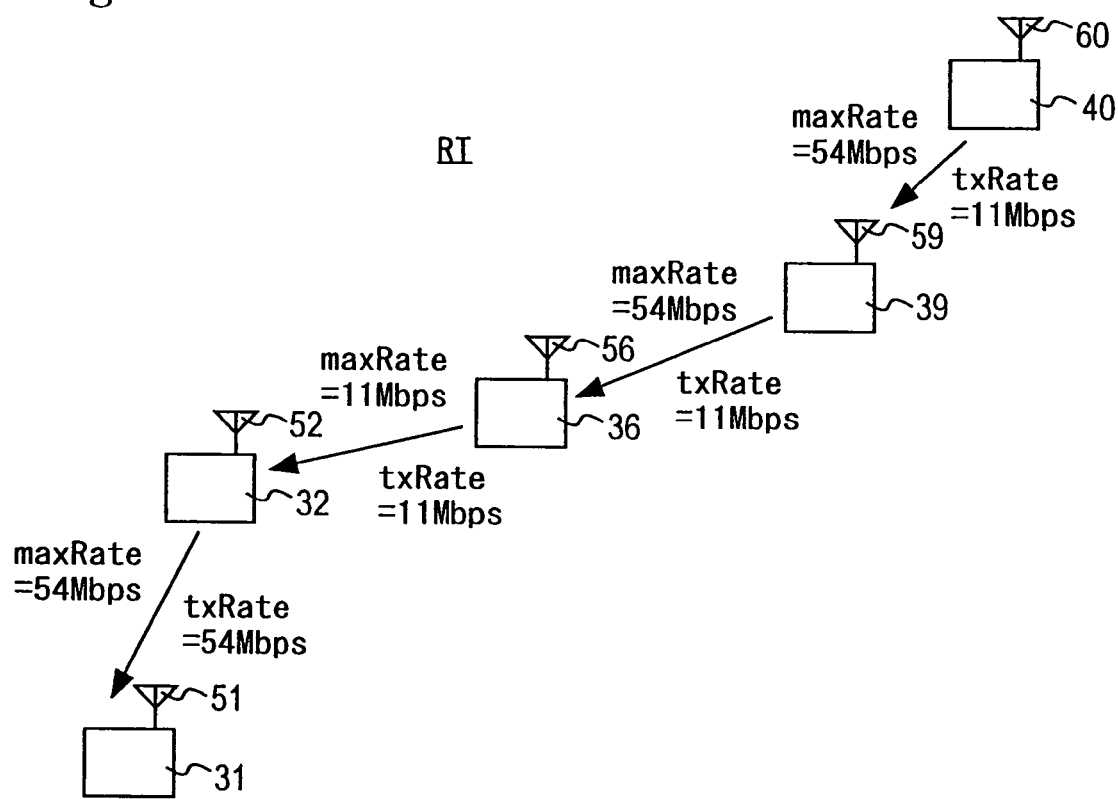
FIG. 16 shows another example of a wireless communication route.

FIG. 14 shows an example of the routing table 21. FIG. 15 shows an example of a wireless communication route. FIG. 16 shows another example of a wireless communication route. Next, how the transmission rate is determined for each relevant wireless device for wireless communication from wireless device 31 (FIG. 1) to wireless device 40 (FIG. 1) will be explained.

Wireless device 31 holds a routing table 21A (FIG. 14). For wireless device 31 to make wireless communication with wireless device 40, wireless device 31's means for determining transmission rates 204 determines the route from wireless device 31 to wireless device 40 to be route RT which is from wireless device 31 through wireless device 32 through wireless device 36 through wireless device 39 to wireless device 40 and detects that the maximum transmission rates maxRate for the wireless interval between wireless devices 31 and 32, that between wireless devices 32 and 36, that between wireless devices 36 and 39 and that between wireless devices 39 and 40 are 54 Mbps, 11 Mbps, 54 Mbps, and 54 Mbps, respectively (see FIG. 13 (bold line) and FIGS. 15 and 16).

Then, wireless device 31's means for determining transmission rates 204 determines the transmission rate txRate of wireless device 31 to be 11 Mbps because route RT from the source (wireless device 31) to the destination (wireless device 40) includes a wireless interval (wireless devices 32 to 36) with the lowest maximum transmission rate (11 Mbps). See FIG. 15.

Also, wireless device 32's means for determining transmission rates 204 determines the transmission rate txRate of wireless device 32 to be 11 Mbps because the route from wireless device 32, in which it is mounted, to the destination (wireless device 40) includes the wireless interval (wireless device 32 to wireless device 36) with the lowest maximum transmission rate (11 Mbps).

Also, wireless device 36's means for determining transmission rates 204 determines the transmission rate txRate of wireless device 36 to be 54 Mbps because the lowest maximum transmission rate is 54 Mbps on the route from wireless device 36, in which it is mounted, to the destination (wireless device 40).

Also, wireless device 39's means for determining transmission rates 204 determines the transmission rate txRate of wireless device 39 to be 54 Mbps because the lowest maximum transmission rate is 54 Mbps on the route from wireless device 39, in which it is mounted, to the destination (wireless device 40).

Next, for wireless device 40 to transmit a packet to wireless device 31 via route RT, wireless device 40's means for determining transmission rates 204 determines the transmission rate txRate of wireless device 40 to be 11 Mbps because the route from wireless device 40, in which it is mounted, to the destination (wireless device 31) includes a wireless interval (wireless device 36 to wireless device 32) with the lowest maximum transmission rate (11 Mbps). See FIG. 16.

Also, wireless device 39's means for determining transmission rates 204 determines the transmission rate txRate of wireless device 39 to be 11 Mbps because the route from wireless device 39, in which it is mounted, to the destination (wireless device 31) includes the wireless interval (wireless device 36 to wireless device 32) with the lowest maximum transmission rate (11 Mbps).

Also, wireless device 36's means for determining transmission rates 204 determines the transmission rate txRate of wireless device 36 to be 11 Mbps because the route from wireless device 36, in which it is mounted, to the destination (wireless device 31) includes the wireless interval (wireless device 36 to wireless device 32) with the lowest maximum transmission rate (11 Mbps).

Also, wireless device 32's means for determining transmission rates 204 determines the transmission rate txRate of wireless device 32 to be 54 Mbps because the lowest maximum transmission rate is 54 Mbps on the route from wireless device 32, in which it is mounted, to the destination (wireless device 31).

As stated above, the means for determining transmission rates 204 of wireless devices 31, 32, 36, 39, and 40 determine the lowest maximum transmission rate maxRate on the route from the wireless devices in which they are mounted, to the destination wireless device to be the transmission rates txtRate of wireless devices 31, 32, 36, 39, and 40, respectively.

When the transmission rates of wireless devices 31, 32, 36, 39, and 40 are determined with the above procedure, in wireless devices 32 and 36, which constitute the wireless interval with the lowest maximum transmission rate maxRate (wireless device 32 to wireless device 36), the volume of received data is the same as the volume of transmitted data, preventing the buffers 18 of wireless devices 32 and 36 from overflowing. Therefore, packet loss in wireless devices 32 and 36 is reduced and stability in wireless communications is improved.

The means for determining transmission rates 204 of wireless devices 33-35, 37, 38, and 41-43 also determine the transmission rates txRate of wireless devices 33-35, 37, 38, and 41-43 with the above procedure and these wireless devices make wireless communications with a destination at the determined transmission rates txRate.

The above explanation assumes that for wireless device 31 to transmit a packet to wireless device 40 via wireless communication route RT, wireless devices 31, 32, 36, and 39 determine their own transmission rates by themselves; however the present invention is not limited thereto. Another possible approach is as follows: for transmission of a packet to wireless device 40 via wireless communication route RT, wireless device 31 determines transmission rates txRate_31, txRate_32, txRate_36, and txRate_39 of wireless devices 31, 32, 36, and 39 respectively and generates a packet PKT including the determined transmission rates txRate_31, txRate_32, txRate_36, and txRate_39 and transmits it at transmission rate txRate_31. In this case, wireless devices 32, 36, and 39, which are to relay the packet PKT, detect their own transmission rates txRate_32, txRate_36, and txRate_39 and relay the packet at the detected transmission rates txRate_32, txRate_36, and txRate_39, respectively. The same is true for wireless device 40 to transmit a packet PKT to wireless device 31 via wireless communication route RT.

Second Embodiment

The second embodiment employs AODV as the protocol which establishes a wireless communication route between a source and a destination. The AODV protocol is an on-demand routing protocol which establishes a wireless communication route to a destination upon issuance of a wireless communication request to implement wireless communication with the destination.

Figure 17:
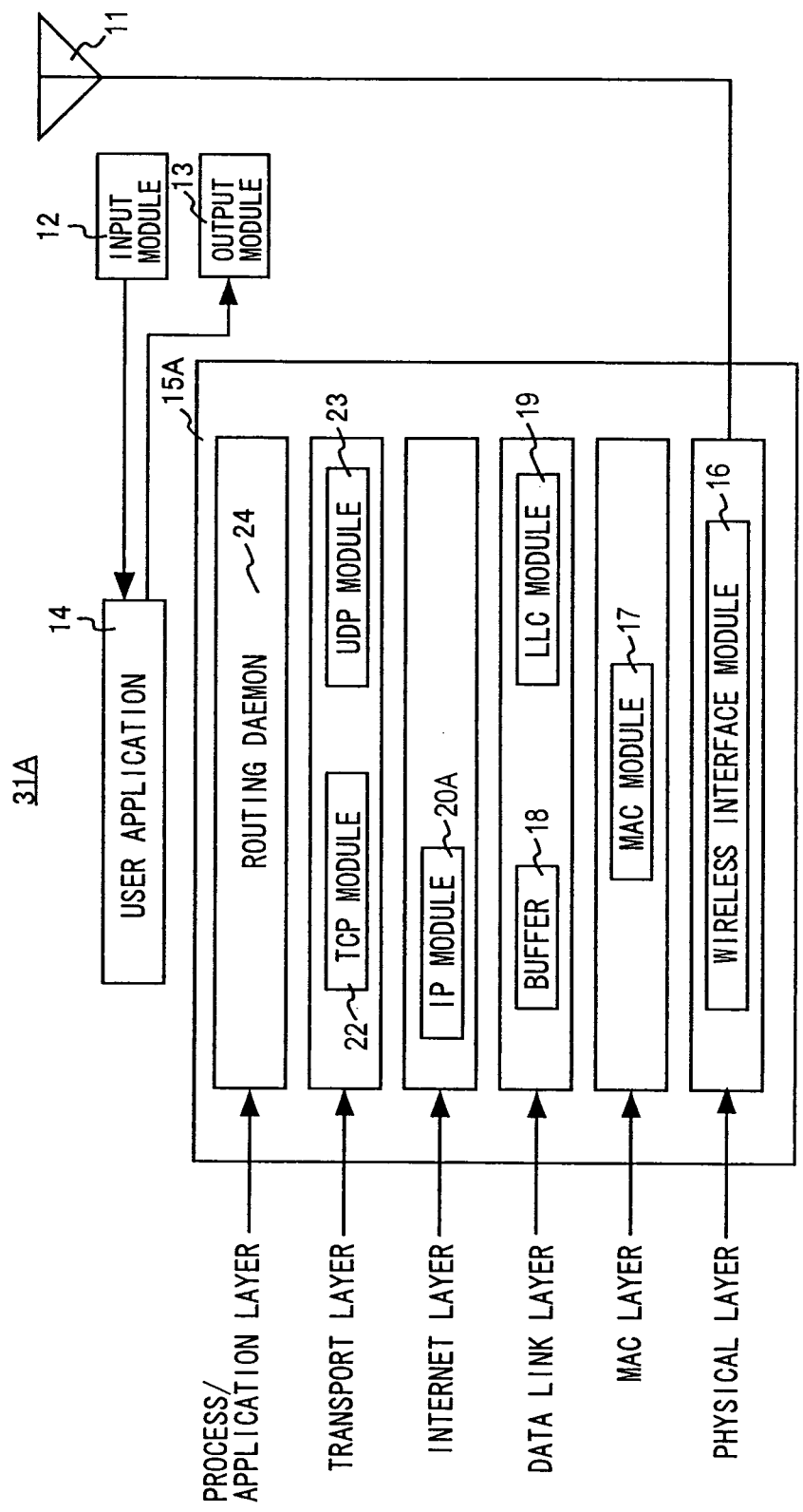
FIG. 17 is a schematic block diagram showing the configuration of each wireless device shown in FIG. 1 according to a second embodiment of the invention.

FIG. 17 is a schematic block diagram showing the configuration of wireless devices 31-43 shown in FIG. 1 according to the second embodiment. In the second embodiment, each of wireless devices 31-43 consists of a wireless device 31A shown in FIG. 17.

In wireless device 31A, the communication control module 15 of wireless device 31 shown in FIG. 2 is replaced by a communication control module 15A and the other components are the same as in wireless device 31. The communication control module 15A is the same as the communication control module 15 except that the routing table 21 of the communication control module 15 is removed and its IP module 20 is replaced by an IP module 20A.

In the explanation below, it is assumed that the data delivery performance consists of average received signal strength indicator RSSI_AVE.

The IP module 20A acquires the data delivery performance (average received signal strength indicator RSSI_AVE) held by the wireless device in which it is mounted. If a request for wireless communication with a destination is issued, the IP module 20A establishes a route RT to the destination in accordance with the AODV protocol and acquires information on data delivery performance (i.e. average received signal strength indicators RSSI_AVE) for wireless intervals on the route RT in conjunction with the establishment of the route. In the AODV protocol as well, since a Hello packet which includes received signal strength indicators RSSI_AVE is sent to neighbor wireless devices, wireless devices 31-43 acquire average received signal strength indicators RSSI_AVE in the same manner as shown in FIGS. 8A and 8B.

The IP module 20A, upon acquiring the data delivery performance for each relevant wireless interval (average received signal strength indicator RSSI_AVE), determines a transmission rate according to the established route RT and acquired data delivery performance (average received signal strength indicators RSSI_AVE) with the above procedure and transfers the determined transmission rate to the MAC module 17.

Figure 18:
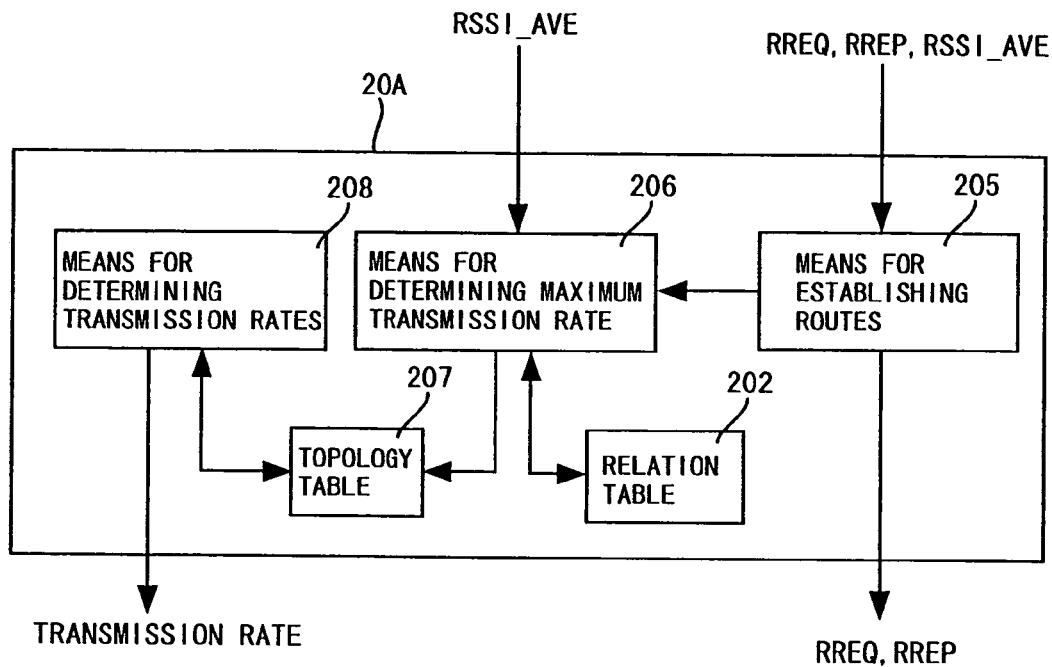
FIG. 18 is a functional block diagram showing, among the functions of the IP module shown in FIG. 17, the function of determining transmission rates.

FIG. 18 is a functional block diagram showing, among the functions of the IP module 20A shown in FIG. 17, the function of determining transmission rates. The IP module 20A includes a relation table 202, a means for establishing routes 205, a means for determining maximum transmission rate 206, a topology table 207, and a means for determining transmission rates 208.

The means for establishing routes 205 receives the data delivery performance (i.e. average received signal strength indicator RSSI_AVE) of the wireless device in which it is mounted from the routing daemon 24 and generates a Route Request packet RREQ including the received data delivery performance (average received signal strength indicator RSSI_AVE) and transmits it.

If the wireless device in which it is mounted is a wireless device which relays the Route Request packet RREQ, the means for establishing routes 205, upon receiving the Route Request packet RREQ, reads the data delivery performance (average received signal strength indicator RSSI_AVE) included in the received Route Request packet RREQ and transfers it to the means for determining maximum transmission rate 206. Then the means for establishing routes 205 reads the information on routing from the wireless device in which it is mounted to the source from the Route Request packet RREQ and transfers it to the means for determining maximum transmission rate 206. Also, the means for establishing routes 205 adds the data delivery performance (i.e. average received signal strength indicator RSSI_AVE) held by the wireless device in which it is mounted, to the Route Request packet RREQ and relays it.

Furthermore, the means for establishing routes 205 generates a Route Reply packet RREP as a reply to the Route Request packet RREQ which includes the data delivery performance (average received signal strength indicators RSSI_AVE) held by the wireless device in which it is mounted, and transmits the generated Route Replay packet RREP.

Furthermore, if the wireless device in which it is mounted is a wireless device which relays the Route Reply packet RREP, the means for establishing routes 205, upon receiving the Route Reply packet RREP, reads the data delivery performance (average received signal strength indicator RSSI_AVE) included in the received packet RREP and transfers it to the means for determining maximum transmission rate 206. Then the means for establishing routes 205 reads the information on routing from the wireless device in which it is mounted to the destination from the Route Reply packet RREP and transfers it to the means for determining maximum transmission rate 206. Also, the means for establishing routes 205 adds the data delivery performance (average received signal strength indicator RSSI_AVE) held by the wireless device in which it is mounted, to the Route Reply packet RREP and relays it.

The means for determining maximum transmission rate 206 receives, from the routing daemon 24, the data delivery performance (average received signal strength indicator RSSI_AVE) held by the wireless device in which it is mounted, and receives, from the means for establishing routes 205, the data delivery performance (average received signal strength indicator RSSI_AVE) and route information which are held by another wireless device. Then, the means for determining maximum transmission rate 206 detects the route to the destination or source based on the route information and determines the maximum transmission rate maxRate for each of the wireless intervals on the detected route according to the data delivery performance (average received signal strength indicator RSSI_AVE), relation table 202 and packet size with the above procedure. Then the means for determining maximum transmission rate 206 creates a topology table 207 in which the determined maximum transmission rates maxRate for the wireless intervals on the route to the destination or source are written.

The topology table 207 consists of information on routing from the source to the destination and maximum transmission rates maxRate written for the wireless intervals on the route.

The means for determining transmission rates 208 detects the maximum transmission rates maxRate for the wireless intervals on the route to the destination or source by reference to the topology table 207 and determines transmission rates txRate based on the detected maximum transmission rates maxRate with the above procedure. Then the means for determining transmission rates 208 transfers the determined transmission rates txRate to the MAC module 17.

Next, how wireless device 31 establishes a wireless communication route RT to wireless device 40 will be explained. When establishing a wireless communication route to wireless device 40 as the destination, wireless device 31 as the source generates a Route Request packet RREQ and broadcasts it.

The Route Request packet RREQ consists of Sender, Type, destination address DST, destination sequence number DSTSeq, source IP address Src, source sequence number SrcSeq, route request packet identifier RREQid, hop number Hops, and data delivery performance (i.e. average received signal strength indicator RSSI_AVE).

"Sender" is the address of a wireless device which transmits the Route Request packet RREQ and the address by which each wireless device receiving the Route Request packet RREQ recognizes the wireless device to which it should transmit next, on the reverse route from the destination to the source. "Sender" is changed by a wireless device which relays the Route Request packet RREQ.

"Type" consists of "RREQ" which indicates that the Route Request packet RREQ is a packet requesting establishment of a route and this "RREQ" remains unchanged.

"DST" (destination address) is the IP address of the wireless device which is the final destination in the wireless communication route to be established. The destination address DT remains unchanged.

"DTSSeq" (destination sequence number) is the newest sequence number that the source of the Route Request packet RREQ has received, among the sequence numbers received from a plurality of routes to the final destination.

"Src" (source IP address) is the IP address of the source of the Route Request packet RREQ. Therefore, this IP address remains unchanged.

"SrcSeq" (source sequence number) is the current sequence number to be used in the route to the source of the Route Request packet RREQ. This source sequence number remains unchanged.

"RREQid" (route request packet identifier) is a sequence number which identifies each of plural Route Request packets RREQ generated successively. Once given, this Route Request packet identifier RREQid is not changed.

"Hops" (hop number) represents the number of hops from the source of the Route Request packet RREQ to each wireless address which relays the Route Request packet RREQ. Thus this hop number is incremented by 1 by each wireless device which relays the Route Request packet RREQ.

Data delivery performance (average received signal strength indicator RSSI_AVE) here consists of data delivery performance (average received signal strength indicator RSSI_AVE) held by the source of the Route Request packet RREQ or a wireless device which relays the Route Request packet RREQ. As the number of hops increases, further data delivery performance information is added to the data delivery performance (average received signal strength indicators RSSI_AVE) information.

Thus, wireless device 31's means for establishing routes 205 generates a Route Request packet RREQ which consists of [Sender 31/RREQ/IP address 40/10/Src 31/20/3/0/RSSI_AVE1 (IP address 31-IP address 32)] and broadcasts it.

Then wireless devices 32 and 37, neighbors to wireless device 31, receive the Route Request packet RREQ from wireless device 31 and wireless devices 32 and 37's means for establishing routes 205 decide whether or not they have received the Route Request packet RREQ for the first time.

If the Route Request packet RREQ has been received for the first time, wireless device 32's means for establishing routes 205 detects the data delivery performance (average received signal strength indicator RSSI_AVE) from the Route Request packet RREQ and transfers it to the means for determining maximum transmission rate 206. Then, wireless device 32's means for establishing routes 205 replaces "Sender 31" in the Route Request packet RREQ by "Sender 32" which indicates that the sender is wireless device 32, adds 1 to the hop number for the number of hops from wireless device 31 to wireless device 32 and adds the data delivery performance (average received signal strength indicator RSSI_AVE2 (IP address 32-IP address 36): RSSI_AVE3 (IP address 32-IP address 35)) held by it to the data delivery performance information to generate a Route Request packet RREQ [Sender 32/RREQ/IP address 40/10/Src 31/20/3/1/RSSI_AVE1 (IP address 31-IP address 32)]: RSSI_AVE2 (IP address 32-IP address 36): RSSI_AVE3 (IP address 32-IP address 35)] and broadcasts the generated Route Request packet RREQ [Sender 32/RREQ/IP address 40/10/Src 31/20/3/1/RSSI_AVE (IP address 31-IP address 32)]: RSSI_AVE2 (IP address 32-IP address 36): RSSI_AVE2 (IP address 32-IP address 35)].

Wireless device 32's means for establishing routes 205 recognizes, based on "Sender 31," that the wireless device to which wireless device 32 should transmit next on the reverse communication route from wireless device 40 to wireless device 31 is wireless device 31.

Wireless device 36's means for establishing routes 205 detects the data delivery performance (RSSI_AVE1 (IP address 31-IP address 32): RSSI-AVE2 (IP address 32-IP address 36))) from the Route Request packet RREQ and transfers it to the means for determining maximum transmission rate 206. Then, wireless device 36's means for establishing routes 205 replaces "Sender 32" in the Route Request packet RREQ by "Sender 36" which indicates that the sender is wireless device 36, adds 1 to the hop number for the number of hops from wireless device 31 to wireless device 36 and adds the data delivery performance (average received signal strength indicator RSSI_AVE4 (IP address 36-IP address 35): RSSI_AVE5 (IP address 36-IP address 38): RSSI_AVE6 (IP address 36-IP address 39): RSSI_AVE7 (IP address 36-IP address 41): RSSI_AVE8 (IP address 36-IP address 37)) held by it to the data delivery performance information to generate a Route Request packet RREQ [Sender 36/RREQ/IP address 40/10/Src 31/20/3/2/RSSI_AVE1 (IP address 31-IP address 32)]: RSSI_AVE2 (IP address 32-IP address 36): RSSI_AVE3 (IP address 32-IP address 35): RSSI_AVE4 (IP address 36-IP address 35): RSSI_AVE5 (IP address 36-IP address 38): RSSI_AVE6 (IP address 36-IP address 39): RSSI_AVE7 (IP address 36-IP address 41): RSSI_AVE8 (IP address 36-IP address 37)] and broadcasts the generated Route Request packet RREQ [Sender 36/RREQ/IP address 40/10/Src 31/20/3/2/RSSI_AVE1 (IP address 31-IP address 32)]: RSSI_AVE2 (IP address 32-IP address 36): RSSI_AVE3 (IP address 32-IP address 35): RSSI_AVE4 (IP address 36-IP address 35): RSSI_AVE5 (IP address 36-IP address 38): RSSI_AVE6 (IP address 36-IP address 39): RSSI_AVE7 (IP address 36-IP address 41): RSSI_AVE8 (IP address 36-IP address 37)].

Wireless device 36's means for establishing routes 205 recognizes, based on "Sender 32," that the wireless device to which wireless device 36 should transmit next on the reverse communication route from wireless device 40 to wireless device 31 is wireless device 32.

Wireless devices 35, 37, 38, 41 and 42 also relay the Route Request packet RREQ in the same manner as wireless devices 32 and 36.

Then the means for establishing routes 205 of wireless device 40, the destination, receives the Route Request packet RREQ [Sender 39/RREQ/IP address 40/10/Src 31/20/3/3/ data delivery performance information held by wireless devices 31, 32, 36, and 39] from wireless device 39.

Then, wireless device 40's means for establishing routes 205 detects, based on the destination address included in the Route Request packet RREQ, "IP address 40," that it is the destination, and reads the data delivery performance information held by wireless devices 31, 32, 36, and 39 from the Route Request packet RREQ and transfers it to the means for determining maximum transmission rate 206. Then, wireless device 40's means for establishing routes 205 generates a Route Reply packet RREP as a reply to the Route Request packet RREQ.

Here, the Route Reply packet RREP consists of Sender, Type, destination address DST, destination sequence number DSTSeq, hop number Hops, and data delivery performance (i.e. average received signal strength indicator RSSI_AVE).

"Sender" is the address of a wireless device which transmits the Route Reply packet RREP. "Sender" is changed by a wireless device which relays the Route Reply packet RREP.

"Type" consists of "RREP" which indicates that the Route Reply packet RREP is a reply to the Route Request packet RREQ and this "RREQ" remains unchanged.

"DST" and "DSTSeq" are the destination address DST and destination sequence number which are included in the Route Request packet RREQ, respectively.

"Hops" (hop number) represents the number of hops from the source of the Route Reply packet RREP to each wireless address which relays the Route Reply packet RREP. Thus this hop number is incremented by 1 by each wireless device which relays the Route Reply packet RREP.

Data delivery performance (average received signal strength indicator RSSI_AVE) here consists of data delivery performance (average received signal strength indicators RSSI_AVE) held by the source of the Route Reply packet RREP or a wireless device which relays the Route Reply packet RREP. As the number of hops increases, further data delivery performance information is added to the data delivery performance (average received signal strength indicators RSSI_AVE) information.

Thus, wireless device 40's means for establishing routes 205 generates a Route Reply packet RREP which consists of [Sender 40/RREP/IP address 40/10/0/RSSI_AVE9 (IP address 40-IP address 39)] and transmits the generated Route Reply packet RREP [Sender 40/RREP/IP address 40/10/0/RSSI_AVE9 (IP address 40-IP address 39)] along the route along which it has received the Route Request packet RREQ. Specifically, wireless device 40's means for establishing routes 205 sends the Route Reply packet RREP to wireless device 39 since it has received the Route Request packet RREQ from wireless device 39.

Wireless device 39's means for establishing routes 205 receives the Route Reply packet RREP [Sender 40/RREP/IP address 40/10/0/RSSI_AVE9 (IP address 40-IP address 39)] from wireless device 40 and reads the data delivery performance (RSSI_AVE9 (IP address 40-IP address 39)) from the received Route Reply packet RREP [Sender 40/RREP/IP address 40/10/0/RSSI_AVE9 (IP address 40-IP address 39)] and transfers it to the means for determining maximum transmission rate 206. Then, wireless device 39's means for establishing routes 205 replaces "Sender 40" in the Route Reply packet RREP [Sender 40/RREP/IP address 40/10/0/RSSI_AVE9 (IP address 40-IP address 39)] by "Sender 39" which indicates that the sender is wireless device 39, adds 1 to the hop number for the number of hops to wireless device 39 and adds the data delivery performance (average received signal strength indicator RSSI_AVE10 (IP address 39-IP address 36) to the data delivery performance information to generate a Route Reply packet RREP [Sender 39/RREP/IP address 40/10/1/RSSI_AVE9 (IP address 40-IP address 39)]: RSSI_AVE10 (IP address 39-IP address 36) and sends the generated Route Reply packet RREP [Sender 39/RREP/IP address 40/10/1/RSSI_AVE9 (IP address 40-IP address 39)]: RSSI_AVE10 (IP address 39-IP address 36) to wireless device 36.

Then, wireless device 36's means for establishing routes 205 receives the Route Reply packet RREP [Sender 39/RREP/IP address 40/10/1/RSSI_AVE9 (IP address 40-IP address 39)]: RSSI_AVE10 (IP address 39-IP address 36) and, as in wireless device 39, generates a Route Reply packet RREP [Sender 36/RREP/IP address 40/10/2/RSSI_AVE9 (IP address 40-IP address 39)]: RSSI_AVE10 (IP address 39-IP address 36): RSSI_AVE11 (IP address 36-IP address 32) and sends the generated Route Reply packet RREP [Sender 36/RREP/IP address 40/10/2/RSSI_AVE9 (IP address 40-IP address 39)]: RSSI_AVE10 (IP address 39-IP address 36): RSSI_AVE11 (IP address 36-IP address 32) to wireless device 32.

Then, wireless device 32's means for establishing routes 205 receives the Route Reply packet RREP [Sender 36/RREP/IP address 40/10/2/RSSI_AVE9 (IP address 40-IP address 39)]: RSSI_AVE10 (IP address 39-IP address 36): RSSI_AVE11 (IP address 36-IP address 32)] and reads the data delivery performance (RSSI_AVE 9(IP address 40-IP address 39)]: RSSI_AVE10 (IP address 39-IP address 36): RSSI_AVE11 (IP address 36-IP address 32)) from the received Route Reply packet RREP [Sender 36/RREP/IP address 40/10/2/RSSI_AVE9 (IP address 40-IP address 39)]: RSSI_AVE10 (IP address 39-IP address 36): RSSI_AVE11 (IP address 36-IP address 32)] and transfers it to the means for determining maximum transmission rate 206. Then, wireless device 32's means for establishing routes 205 replaces the Route Reply packet RREP [Sender 36/RREP/IP address 40/10/2/RSSI_AVE9 (IP address 40-IP address 39)]: RSSI_AVE10 (IP address 39-IP address 36): RSSI_AVE11 (IP address 36-IP address 32)] by a Route Reply packet RREP [Sender 32/RREP/IP address 40/10/3/RSSI_AVE9 (IP address 40-IP address 39)]: RSSI_AVE10 (IP address 39-IP address 36): RSSI_AVE11 (IP address 36-IP address 32): RRSI_AVE12 (IP address 32-IP address 31)] and transfers it to wireless device 31.

Since transmission of the Route Request packet RREQ from wireless device 31 to wireless device 40 establishes the route from wireless device through wireless device 32, through wireless device 36, and through wireless device 39 to wireless device 40, wireless devices 32, 36, and 39 can send the Route Reply packet RREP to wireless device 31 (source) along the route along which they have received the Route Request packet RREQ.

Upon receiving the Route Reply packet RREP [Sender 32/RREP/IP address 40/10/3/RSSI_AVE9 (IP address 40-IP address 39)]: RSSI_AVE10 (IP address 39-IP address 36): RSSI_AVE11 (IP address 36-IP address 32): RRSI_AVE12 (IP address 32-IP address 31)], the means for establishing routes 205 of wireless device 31, the source, reads the data delivery performance (received signal strength indicator RSSI_AVE9 (IP address 40-IP address 39): RSSI_AVE10 (IP address 39-IP address 36): RSSI_AVE11 (IP address 36-IP address 32): RRSI_AVE12 (IP address 32-IP address 31)) from the received Route Reply packet RREP and transfers it to the means for determining maximum transmission rate 206.

As described above, while the means for establishing routes 205 of wireless devices 31, 32, 36, 39, and 40 establish the route from wireless device 31 through wireless device 32, through wireless device 36, and through wireless device 39 to wireless device 40, their means for determining maximum transmission rate 206 acquire bidirectional data delivery performance (average received signal strength indicators RSSI_AVE) for each of the wireless intervals and information on routing to the source (wireless device 31) or destination (wireless device 40).

In these devices, upon acquiring the data delivery performance (average received signal strength indicator RSSI_AVE) for each wireless interval, the means for determining maximum transmission rate 206 determines the maximum transmission rate maxRate for each wireless interval with the above procedure and creates a topology table 207 in which the determined maximum transmission rates maxRate for the wireless intervals on the route are written.

Figure 19:
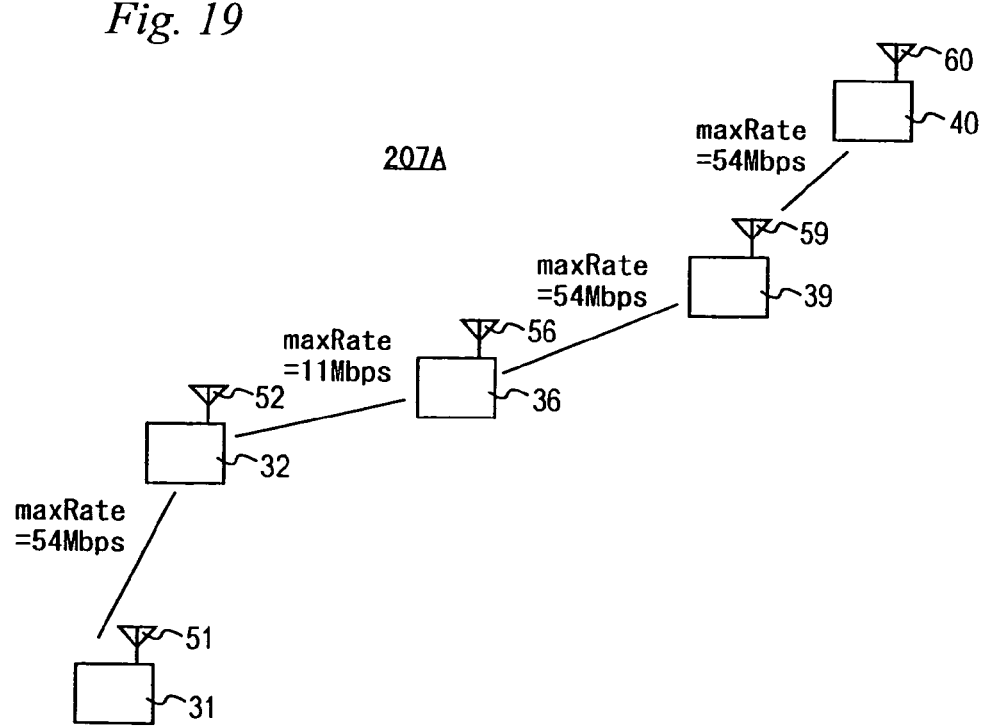
FIG. 19 shows an example of the topology table shown in FIG. 18.

FIG. 19 shows an example of the topology table 207 shown in FIG. 18. The means for determining maximum transmission rate 206 creates a topology table 207A as shown in FIG. 19 through the above sequence.

Then the means for determining transmission rates 208 determines the transmission rates for wireless devices 31, 32, 36, 39, and 40 as illustrated in FIGS. 15 and 16 by reference to the topology table 207A and transfers the determined transmission rates to the MAC module 17.

Wireless device 31, the source, upon receiving the Route Reply packet RREP from wireless device 40, the destination, determines transmission rates with the above procedure and sends a data packet to wireless device 40 as the destination at the determined transmission rates. This activates wireless communication route RT from wireless device 31 through wireless device 32, through wireless device 36, and through wireless device 39 to wireless device 40 and an ad hoc network consisting of wireless devices 31, 32, 36, 39, and 40 is thus autonomously constructed.

Even when wireless communications are made between a source and a destination in accordance with an on-demand routing protocol like this, each wireless device determines the lowest maximum transmission rate maxRate on the route to the destination to be its own transmission rate txRate and transmits or relays packets at that transmission rate.

Therefore, according to the present invention, packet loss is reduced in wireless devices on the route established between a source and a destination, and stability in wireless communications is improved.

Whether "average received signal strength indicator RSSI_AVE and packet loss rate PKT_LOSS" or "modified received signal strength indicator RSSI_modify" or "modified received signal strength indicator RSSI_modify and packet loss rate PKT_LOSS" is used as data delivery performance information, the wireless devices on the wireless communication route RT between the source and destination each acquire data delivery performance information in conjunction with the establishment of the wireless communication route RT and determine the transmission rates for the wireless intervals with the above procedure.

The other details are the same as those described in the first embodiment.

Although it has been explained that the maximum transmission rate maxRate for each wireless interval is determined by weighting by packet size, the present invention is not limited thereto. It is also possible to determine the maximum transmission rate maxRate for each wireless interval according to the type of application and data delivery performance. For applications which require real time communications such as VoIP, the packet size is 160 bytes and for data relay applications, the packet size is 1500 bytes. Hence, if the type of application is known and the packet size is fixed, the maximum transmission rate maxRate for each wireless interval may be determined according to the type of application and data delivery performance with the above procedure.

Another possible approach is as follows. A packet size threshold is set between 160 bytes and 500 bytes and if the packet size is 160 bytes, or below the threshold, a relatively low standard transmission rate is selected as the maximum transmission rate maxRate and if the packet size is 500, 1000 or 1500 bytes, or above the threshold, a relatively high standard transmission rate is selected as the maximum transmission rate maxRate.

In the present invention, the MAC module 17 and wireless interface module 16 constitute a transmitting means (transmitting unit) and the routing daemon, which receives data delivery performance (average received signal strength indicator RSSI_AVE) information, constitutes an acquiring means (acquiring unit).

It should be understood that the preferred embodiments disclosed herein are illustrative and not restrictive. The scope of the present invention is defined by the appended Claims rather than by the above description of the preferred embodiments and all changes that fall within metes and bounds of the claims, or equivalence of such metes and bounds are therefore intended to be embraced by the claims.

What is claimed is:

1. A wireless device constituting an autonomously established wireless network in which a source wireless device makes multi-hop wireless communication with a destination wireless device, comprising:

a first communication control unit configured to determine, among n maximum transmission rates in n wireless intervals existent between the wireless device and the destination wireless device (n is equal to or more than 2), the lowest maximum transmission rate as the wireless device's transmission rate;

a transmitting unit which transmits a packet at a transmission rate determined by the first communication control unit configured to determine transmission rate; and a second communication control unit configured to determine the n maximum transmission rates according to packet delivery performance indicating performance of packet delivery to wireless devices existent in the n wireless intervals, wherein the first communication control unit configured to determine the lowest maximum transmission rate among the n maximum transmission rates determined by the second communication control unit as the wireless device's transmission rate, and wherein the n wireless intervals include at least a wireless interval from the wireless device to another wireless device and a wireless interval from said another wireless device to the destination wireless device.

2. The wireless device according to claim 1, wherein the second communication control unit configured to determine maximum transmission rate determines the n maximum transmission rates according to type of application which generates the packet and the packet delivery performance.

3. The wireless device according to claim 1, wherein the second communication control unit configured to determine maximum transmission rate determines the n maximum transmission rates according to size of the packet and the packet delivery performance.

4. The wireless device according to claim 3, wherein the second communication control unit configured to determine maximum transmission rate:
holds relation between the packet delivery performance and standard transmission rate; and
detects a standard transmission rate corresponding to the packet delivery performance; and
determines the n maximum transmission rates by carrying out weighting on the detected standard transmission rate by packet size.

5. The wireless device according to claim 4, wherein the second communication control unit configured to determine maximum transmission rate:
when the packet size is equal to or more than a reference size, if the data delivery performance is equal to or more than a first data delivery performance threshold, determines the n maximum transmission rates by selecting the highest standard transmission rate among a plurality of usable standard transmission rates as maximum transmission rate; and
when the packet size is smaller than the reference size, if the data delivery performance is a second data delivery performance threshold better than the first data delivery performance threshold, determines the n maximum transmission rates by selecting the highest standard transmission rate among the plural standard transmission rates as maximum transmission rate.

6. The wireless device according to claim 1, further comprising:
a third communication control unit configured to acquire performance of data delivery to all wireless devices constituting the wireless network; and
a fourth communication control unit configured to establish a route from the wireless device to the destination wireless device,
wherein the second communication control unit configured to select performance of data delivery to wireless devices existent on the route from among data delivery performances unit and determines the n maximum transmission rates using the selected data delivery performance.

7. The wireless device according to claim 6, wherein the third communication control unit configured to acquire performance of data delivery to all the wireless devices in synchronization with transmission and receipt of route information in the wireless network.

8. The wireless device according to claim 1, further comprising:
a third communication control unit configured to acquire performance of data delivery to wireless devices existent in the n wireless intervals in the process of establishing a route from a source to a destination;
wherein the second communication control unit configured to determine the n maximum transmission rates using the data delivery performance.

9. The wireless device according to claim 1, wherein the data delivery performance includes average received signal strength.

10. The wireless device according to claim 1, further comprising a second communication control unit configured to determine maximum transmission rate,
determines the n maximum transmission rates by selecting a relatively high standard transmission rate among a plurality of usable standard transmission rates as maximum transmission rate when transmission rate's influence on throughput is more than the transmission rate's influence on packet loss; and
determines the n maximum transmission rates by selecting a relatively low standard transmission rate among the plural standard transmission rates as maximum transmission rate when the packet loss influences throughput more than the transmission rate;
wherein the first communication control unit configured to determine transmission rates determines the lowest maximum transmission rate among the n maximum transmission rates as the wireless device's transmission rate.

11. The wireless device according to claim 1, further comprising a second communication control unit configured to determine maximum transmission rate,
determines the n maximum transmission rates by selecting a relatively high standard transmission rate among a plurality of usable standard transmission rates as maximum transmission rate when packet size is larger than a threshold, and
determines the n maximum transmission rates by selecting a relatively low standard transmission rate among the plural standard transmission rates as maximum transmission rate when the packet size is equal to or smaller than the threshold,
wherein the second communication control unit configured to determine the lowest maximum transmission rate among the n maximum transmission rates as the wireless device's transmission rate.

12. A wireless network including a wireless device which constitutes an autonomously established wireless network in which a source wireless device makes multi-hop wireless communication with a destination wireless device, the wireless device comprising:
a first communication control unit configured to determine, among n maximum transmission rates in n wireless intervals existent between the wireless device and the destination wireless device (n is equal to or more than 2), the lowest maximum transmission rate as the wireless device's transmission rate;
a transmitting unit which transmits a packet at the transmission rate determined by the first communication control unit configured to determine transmission rates; and
a second communication control unit configured to determine the n maximum transmission rates according to packet delivery performance indicating performance of packet delivery to wireless devices existent in the n wireless intervals;
wherein the first communication control unit configured to determine the lowest maximum transmission rate among the n maximum transmission rates determined by the second communication control unit as the wireless device's transmission rate, and wherein the n wireless intervals include at least a wireless interval from the wireless device to another wireless device and a wireless interval from said another wireless device to the destination wireless device.

13. A wireless device constituting an autonomously established wireless network in which a source wireless device makes multi-hop wireless communication with a destination wireless device, comprising:

- a first communication control unit configured to determine, among n maximum transmission rates in n wireless intervals existent between the wireless device and the destination wireless device (n is equal to or more than 2), the lowest maximum transmission rate as the wireless device's transmission rate;
- a transmitting unit which transmits a packet at a transmission rate determined by the first communication control unit configured to determine transmission rates;
- a second communication control unit configured to determine maximum transmission rate, determines the n maximum transmission rates by selecting a relatively high standard transmission rate among a plurality of usable standard transmission rates as maximum transmission rate when transmission rate's influence on throughput is more than the transmission rate's influence on packet loss, and determines the n maximum transmission rates by selecting a relatively low standard transmission rate among the plural standard transmission rates as maximum transmission rate when the packet loss influences throughput more than the transmission rate, wherein the first communication control unit configured to determine transmission rates determines the lowest maximum transmission rate among the n maximum transmission rates as the wireless device's transmission rate, and wherein the n wireless intervals include at least a wireless interval from the wireless device to another wireless device and a wireless interval from said another wireless device to the destination wireless device.

* * * * *